US011924863B2

(12) United States Patent
Huang et al.

(10) Patent No.: US 11,924,863 B2
(45) Date of Patent: Mar. 5, 2024

(54) SUBBAND PRECODING SIGNALING IN A WIRELESS COMMUNICATIONS NETWORK

(71) Applicant: QUALCOMM Incorporated, San Diego, CA (US)

(72) Inventors: Yi Huang, San Diego, CA (US); Peter Gaal, San Diego, CA (US); Wanshi Chen, San Diego, CA (US); Jay Kumar Sundararajan, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 16/949,368

(22) Filed: Oct. 27, 2020

(65) Prior Publication Data

US 2021/0127408 A1  Apr. 29, 2021

Related U.S. Application Data

(60) Provisional application No. 62/927,058, filed on Oct. 28, 2019.

(51) Int. Cl.
*H04W 72/50* (2023.01)
*H04W 72/1268* (2023.01)
*H04W 72/23* (2023.01)

(52) U.S. Cl.
CPC ..... *H04W 72/535* (2023.01); *H04W 72/1268* (2013.01); *H04W 72/23* (2023.01)

(58) Field of Classification Search
USPC ....................................................... 370/329
See application file for complete search history.

(56) References Cited

U.S. PATENT DOCUMENTS

| 9,414,371 | B2* | 8/2016 | Pi ..................... H04L 25/0226 |
| 9,571,173 | B2* | 2/2017 | Geirhofer ............ H04B 7/0465 |
| 2014/0355707 | A1* | 12/2014 | Kim ..................... H04B 7/0456 |
| | | | 375/267 |

(Continued)

FOREIGN PATENT DOCUMENTS

| CN | 108781440 A | 11/2018 |
| CN | 109075828 A | 12/2018 |

(Continued)

OTHER PUBLICATIONS

Ericsson et al. Way Forward for Rel-10 Feedback Framework, 3GPP R1-101683 (Year: 2010).*

(Continued)

*Primary Examiner* — Jeffrey M Rutkowski
*Assistant Examiner* — Luna Weissberger
(74) *Attorney, Agent, or Firm* — Haynes and Boone, LLP

(57) ABSTRACT

Wireless communications systems and methods related to wireless communications in a system are provided. A user equipment (UE) may receive from a base station (BS), a subband precoding configuration including a first number of bits and an indication of a common size for each subband of a set of subbands. The UE may select a plurality of precoders from a precoder candidate set based on the first number and the common size. The precoder candidate set may be based on an order of a spatial direction. Additionally, the UE may transmit to the BS, a communication signal in the plurality of subbands using the plurality of precoders.

29 Claims, 15 Drawing Sheets

(56) References Cited

U.S. PATENT DOCUMENTS

2018/0115389 A1* 4/2018 Chen .................. H04L 1/0009
2018/0367193 A1 12/2018 Tan et al.
2019/0334595 A1* 10/2019 Ji ...................... H04B 7/0695
2020/0358509 A1* 11/2020 Wernersson .......... H04L 5/0051

FOREIGN PATENT DOCUMENTS

CN   109565311 A   4/2019
WO   2017181345 A1  10/2017

OTHER PUBLICATIONS

International Search Report and Written Opinion—PCT/US2020/057670—ISA/EPO—dated Feb. 18, 2021.
Nokia., et al., "UL Codebook Based Transmission and UL Codebook Design", 3GPP TSG-RAN WG1 Meeting #91, 3GPP Draft; R1-1720886 (UL MIMO Codebook), 3rd Generation Partnership Project (3GPP), Mobile Competence Centre; 650, Route Des Lucioles; F-06921 Sophia-Antipolis Cedex; France vol. RAN WG1, No. Reno, USA; Nov. 27, 2017-Dec. 1, 2017, Nov. 18, 2017 (Nov. 18, 2017), 10 Pages, XP051370278, Retrieved from the Internet: URL: http://www.3gpp.org/ftp/tsg%5Fran/WG1%5FRL1/TSGR1%5F91/Docs [retrieved on Nov. 18, 2017], p. 4, Paragraph Section 2.1 p. 7, Paragraph Section 5—p. 8.

* cited by examiner

900

Precoding Matrix W for a single-layer transmission for a UE having two antenna ports

| TPMI index | W (ordered from left to right in increasing order of TPMI index) | | | | | | | |
|---|---|---|---|---|---|---|---|---|
| 0~5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | - | - |

SUBBAND PRECODING SIGNALING IN A WIRELESS COMMUNICATIONS NETWORK

CROSS REFERENCE TO RELATED APPLICATIONS & PRIORITY CLAIM

The present application claims priority to and the benefit of U.S. Provisional Patent Application No. 62/927,058 filed Oct. 28, 2019, which is hereby incorporated by reference in its entirety as if fully set forth below and for all applicable purposes.

TECHNICAL FIELD

This application relates to wireless communication systems, and more particularly to subband precoding signaling in a wireless communications network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

A UE may transmit a data stream using one or more antennas to a BS. The UE may apply a precoder to symbols that are mapped to a plurality of subbands. In conventional wideband precoding, the UE applies only one precoder ("a common precoder") for all subbands across the physical uplink shared channel (PUSCH) assignment. In subband precoding, the UE may apply a plurality of precoders for a plurality of subbands across the PUSCH assignment.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes receiving, by a user equipment (UE) from a base station (BS), a subband precoding configuration, the subband precoding configuration including a first number of bits and an indication of a common size for each subband of a set of subbands; selecting, by the UE, a plurality of precoders from a precoder candidate set based on the first number and the common size, the precoder candidate set being based on an order of a spatial direction; and transmitting, by the UE to the BS in the set of subbands, a communication signal generated based on the selected plurality of precoders.

In an aspect of the disclosure, an apparatus includes a transceiver configured to: receive, by a UE from a BS, a subband precoding configuration, the subband precoding configuration including a first number of bits and an indication of a common size for each subband of a set of subbands; and transmit, by the UE to the BS in the set of subbands, a communication signal generated based on a plurality of precoders; and a processor configured to: select the plurality of precoders from a precoder candidate set based on the first number and the common size, the precoder candidate set being based on an order of a spatial direction.

In an aspect of the disclosure, a computer-readable medium having program code recorded thereon, the program code including: code for causing a UE to receive from a BS, a subband precoding configuration, the subband precoding configuration including a first number of bits and an indication of a common size for each subband of a set of subbands; code for causing the UE to select a plurality of precoders from a precoder candidate set based on the first number and the common size, where the precoder candidate set is based on an order of a spatial direction; and code for causing the UE to transmit to the BS in the set of subbands, a communication signal generated based on the selected plurality of precoders.

In an aspect of the disclosure, an apparatus includes means for receiving from a BS, a subband precoding configuration, the subband precoding configuration including a first number of bits and an indication of a common size for each subband of a set of subbands; means for selecting a plurality of precoders from a precoder candidate set based on the first number and the common size, where the precoder candidate set is based on an order of a spatial direction; and means for transmitting, to the BS in the set of subbands, a communication signal generated based on the selected plurality of precoders.

In an aspect of the disclosure, a method of wireless communication includes receiving, by a UE from a BS, a first precoder for a plurality of subbands and a first subband precoding configuration indicating a plurality of precoders for a subset of the plurality of subbands, where the plurality of precoders overrides the first precoder for the subset; and transmitting, by the UE to the BS in the plurality of subbands, a communication signal generated based on the first precoder and the plurality of precoders.

In an aspect of the disclosure, an apparatus includes a transceiver configured to: receive, by a UE from a BS, a first precoder for a plurality of subbands and a first subband precoding configuration indicating a plurality of precoders for a subset of the plurality of subbands, where the plurality of precoders overrides the first precoder for the subset; and transmit, by the UE to the BS in the plurality of subbands, a communication signal generated based on the first precoder and the plurality of precoders.

In an aspect of the disclosure, a computer-readable medium having program code recorded thereon, the program code including: code for causing a UE to receive from a BS, a first precoder for a plurality of subbands and a first subband precoding configuration indicating a plurality of precoders for a subset of the plurality of subbands, where the plurality of precoders overrides the first precoder for the subset; and code for causing the UE to transmit to the BS in the plurality of subbands, a communication signal generated based on the first precoder and the plurality of precoders.

In an aspect of the disclosure, an apparatus includes means for receiving from a BS, a first precoder for a plurality of subbands and a first subband precoding configuration indicating a plurality of precoders for a subset of the plurality of subbands, where the plurality of precoders overrides the first precoder for the subset; and means for transmitting to the BS in the plurality of subbands, a communication signal generated based on the first precoder and the plurality of precoders.

In an aspect of the disclosure, a method of wireless communication includes transmitting, by a BS to a UE, a subband precoding configuration including a first number of bits and an indication of a common size for each subband of a set of subbands; selecting, by the BS, a plurality of precoders from a precoder candidate set based on the first number and the common size, the precoder candidate set being based on an order of a spatial direction; and receiving, by the BS from the UE, a communication signal in the set of subbands based on the plurality of precoders.

In an aspect of the disclosure, an apparatus includes a transceiver configured to: transmit, by a BS to a UE, a subband precoding configuration, the subband precoding configuration including a first number of bits and an indication of a common size for each subband of a set of subbands; and receive, by the BS from the UE, a communication signal in a plurality of subbands based on a plurality of precoders; and a processor configured to: select the plurality of precoders from a precoder candidate set based on the first number and the common size, the precoder candidate set being based on an order of a spatial direction.

In an aspect of the disclosure, a computer-readable medium having program code recorded thereon, the program code including: code for causing a BS to transmit to a UE, a subband precoding configuration, the subband precoding configuration including a first number of bits and an indication of a common size for each subband of a set of subbands; code for causing the BS to select a plurality of precoders from a precoder candidate set based on the first number and the common size, where the precoder candidate set is based on an order of a spatial direction; and code for causing the BS to receive from the BS, a communication signal in the set of subbands based on the plurality of precoders.

In an aspect of the disclosure, an apparatus includes means for transmitting to a UE, a subband precoding configuration including a first number of bits and an indication of a common size for each subband of a set of subbands; means for selecting a plurality of precoders from a precoder candidate set based on the first number and the common size, where the precoder candidate set is based on an order of a spatial direction; and means for receiving from the UE, a communication signal in the set of subbands based on the plurality of precoders.

In an aspect of the disclosure, a method of wireless communication includes transmitting, by a BS to a UE, a first precoder for a plurality of subbands and a first subband precoding configuration indicating a plurality of precoders for a subset of the plurality of subbands, where the plurality of precoders overrides the first precoder for the subset; and receiving, by the BS from the UE, a communication signal in the plurality of subbands based on the first precoder and the plurality of precoders.

In an aspect of the disclosure, an apparatus includes a transceiver configured to: transmit, by a BS to a UE, a first precoder for a plurality of subbands and a first subband precoding configuration indicating a plurality of precoders for a subset of the plurality of subbands, where the plurality of precoders overrides the first precoder for the subset; and receive, by the BS from the UE, a communication signal in the plurality of subbands based on the first precoder and the plurality of precoders.

In an aspect of the disclosure, a computer-readable medium having program code recorded thereon, the program code including: code for causing a BS to transmit to a UE, a first precoder for a plurality of subbands and a first subband precoding configuration indicating a plurality of precoders for a subset of the plurality of subbands, where the plurality of precoders overrides the first precoder for the subset; and code for causing the BS to receive from the UE, a communication signal in the plurality of subbands based on the first precoder and the plurality of precoders.

In an aspect of the disclosure, an apparatus includes means for transmitting to a UE, a first precoder for a plurality of subbands and a first subband precoding configuration indicating a plurality of precoders for a subset of the plurality of subbands, where the plurality of precoders overrides the first precoder for the subset; and means for receiving from the UE, a communication signal in the plurality of subbands based on the first precoder and the plurality of precoders.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 9 is a table of a codebook subset corresponding to the UE's and/or the BS's selection of the plurality of precoders according to some aspects of the present disclosure.

DETAILED DESCRIPTION

Figure 1:
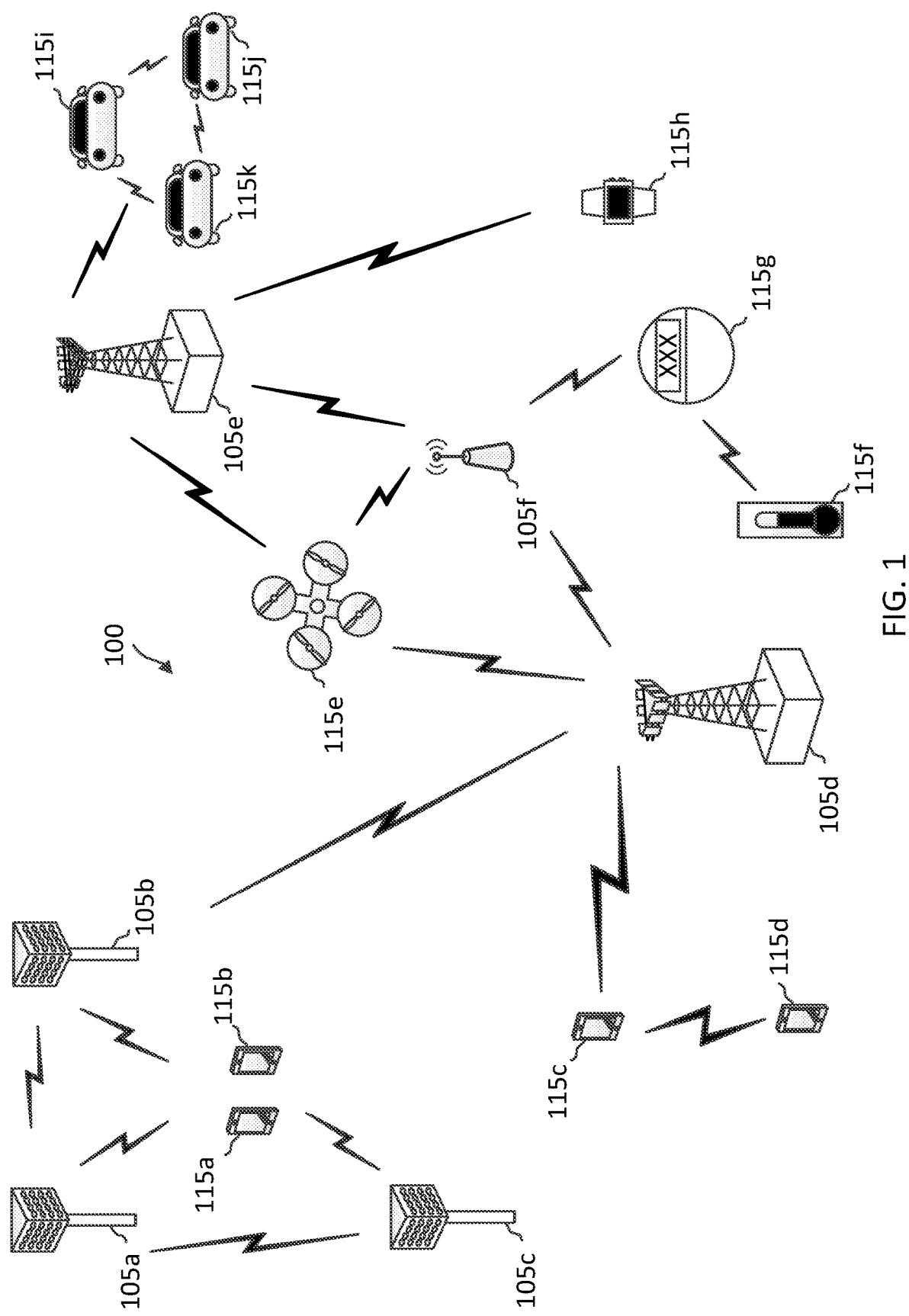
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

In conventional wideband precoding, the UE applies only one precoder ("a common precoder") for all subbands across a PUSCH assignment. In subband precoding, the UE may apply a plurality of precoders for a plurality of subbands across a PUSCH assignment. The BS may transmit to the UE, a subband precoding configuration indicating a plurality of precoders for a plurality of subbands. Both wideband precoding and subband may have advantages. An advantage of using wideband precoding is its simplicity because only one precoder is signaled and used for a plurality of subbands. An advantage of using subband precoding rather than wideband precoding may provide for beamforming gains. Selection of a given precoder may function as a mechanism for selecting specific beams or beamforming. The BS and UE may communicate information using beams, and each of the BS and the UE may steer its energy in a particular direction, reaping array gains in the process and bridging the link budget. Beamforming techniques may be used to increase the signal level received by a device and to avoid transmission losses when using, for example, mmWave frequencies. A beamformer enhances energy over its targeted/intended direction(s), obtaining a certain antenna gain in a given direction while having attenuation in others. Beamforming combines signals from multiple antenna elements in an antenna array, so that the combined signal level increases when several signal phases align (constructive interference). The signals from each antenna element are transmitted with a slightly different phase (delay) to produce a narrow beam directed towards the receiver. Accordingly, a beamforming gain may result on a per-subband basis.

An improved beamforming gain on a per-subband basis may be used to explore channel frequency selectivity. Additionally, improved beamforming gain on a per-subband basis may also be used to explore variation of interference levels. The interference may be different on different RBs. Moreover, improved beamforming gain on a per-subband basis may also be used to explore variation of multi-user (MU) patterns across the PUSCH assignment. MU may refer to multiple UEs using the same RB for transmission. MU may apply to some RBs, but not others. On different RBs, it may be desirable to select different precoders to match with the MU pattern.

The present application provides techniques for using a combination of wideband precoding and subband precoding. In some aspects, the BS transmits a first precoder for a plurality of subbands and a subband precoding configuration indicating a plurality of precoders for a subset of the plurality of subbands. The plurality of precoders may override the first precoder for the subset of subbands. The UE may receive the first precoder and the subband precoding configuration and transmit a communication signal in the plurality of subbands using the first precoder and the plurality of precoders. For example, the UE may use the plurality of precoders for the subset of subbands and use the first precoder for the other remaining subbands in the plurality of subbands.

Another advantage of using subband precoding may provide for flexibility in configuring different precoders for different subbands in the PUSCH assignment. For example, based on a channel condition, different precoders may be selected or used for UL transmissions. The BS may transmit the subband precoding configuration in, for example, the DCI. The DCI may be transmitted via PDCCH for dynamic scheduling. The DCI may indicate to the UE which precoder to apply for which subband. The UE may receive the DCI and determine, based on the DCI, which precoders to apply for which subbands. If the BS signals the subband precoding configuration in the DCI, the number of bits in the DCI for signaling the subband precoding configuration may be dynamic or variable. For example, if the BS uses five bits in the DCI for indicating a precoder for each subband, the number of bits for signaling the subband precoding configuration in the DCI depends on the number of subbands assigned for the PUSCH transmission. Accordingly, the DCI size corresponding to each PUSCH transmission may depend on the number of subbands assigned for the PUSCH transmission. The DCI size may refer to the number of DCI bits. If the UE does not know the DCI size, the UE may attempt a large number of combinations of different DCI sizes to decode the DCI, potentially increasing the DCI decoding complexity for the UE.

The present application provides techniques for removing the DCI size ambiguity. If the UE knows the DCI size, the UE may decode the DCI without attempting a large number of combinations for different DCI sizes, thus decreasing the DCI decoding complexity for the UE compared to the DCI size being variable. In some aspects, a subband size is common to all subbands in a PUSCH assignment, and the number of bits for indicating a subband precoding configuration is fixed. The subband precoding configuration may indicate a plurality of precoders for a set of subbands in the PUSCH assignment. Accordingly, the ambiguity of the DCI size is removed because the number of bits indicating the subband precoding configuration is fixed. The number of bits for indicating a precoder per subband of the set of subbands, however, may be variable. To determine the number of bits for indicating a precoder per subband, the BS and/or the UE may first determine the total number of subbands for the PUSCH assignment by dividing the total number of resource blocks (RBs) in the PUSCH assignment by the common subband size. Next, the BS and/or the UE may determine the number of bits for indicating a precoder per subband by dividing the number of bits for indicating the subband precoding configuration by the total number of subbands for the PUSCH assignment.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V) communications among the UEs 115*i*-115*k*, vehicle-to-everything (V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities.

Figure 2:
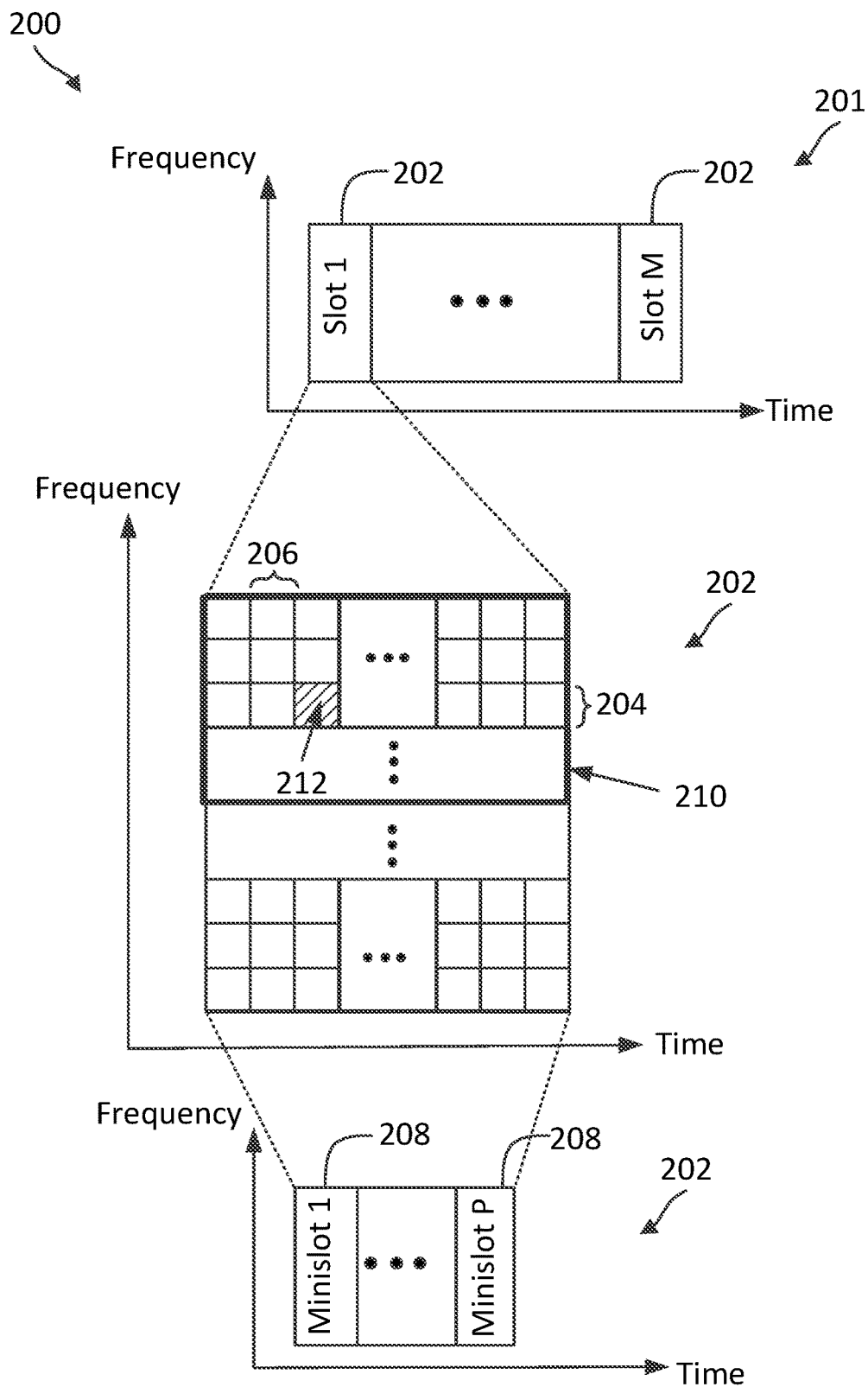
FIG. 2 is a timing diagram illustrating a transmission frame structure according to some aspects of the present disclosure.

FIG. 2 is a timing diagram illustrating a transmission frame structure 200 according to some aspects of the present disclosure. The transmission frame structure 200 may be employed by BSs such as the BSs 105 and UEs such as the UEs 115 in a network such as the network 100 for communications. In particular, the BS may communicate with the UE using time-frequency resources configured as shown in the transmission frame structure 200. In FIG. 2, the x-axes represent time in some arbitrary units, and the y-axes represent frequency in some arbitrary units. The transmission frame structure 200 includes a radio frame 201. The duration of the radio frame 201 may vary depending on some aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on, for example, the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time. A resource block group (RBG) may include one or more RBs and may also be referred to as a subband.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into P number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a RB 210 (e.g., including about 12 subcarriers 204).

Figure 3:
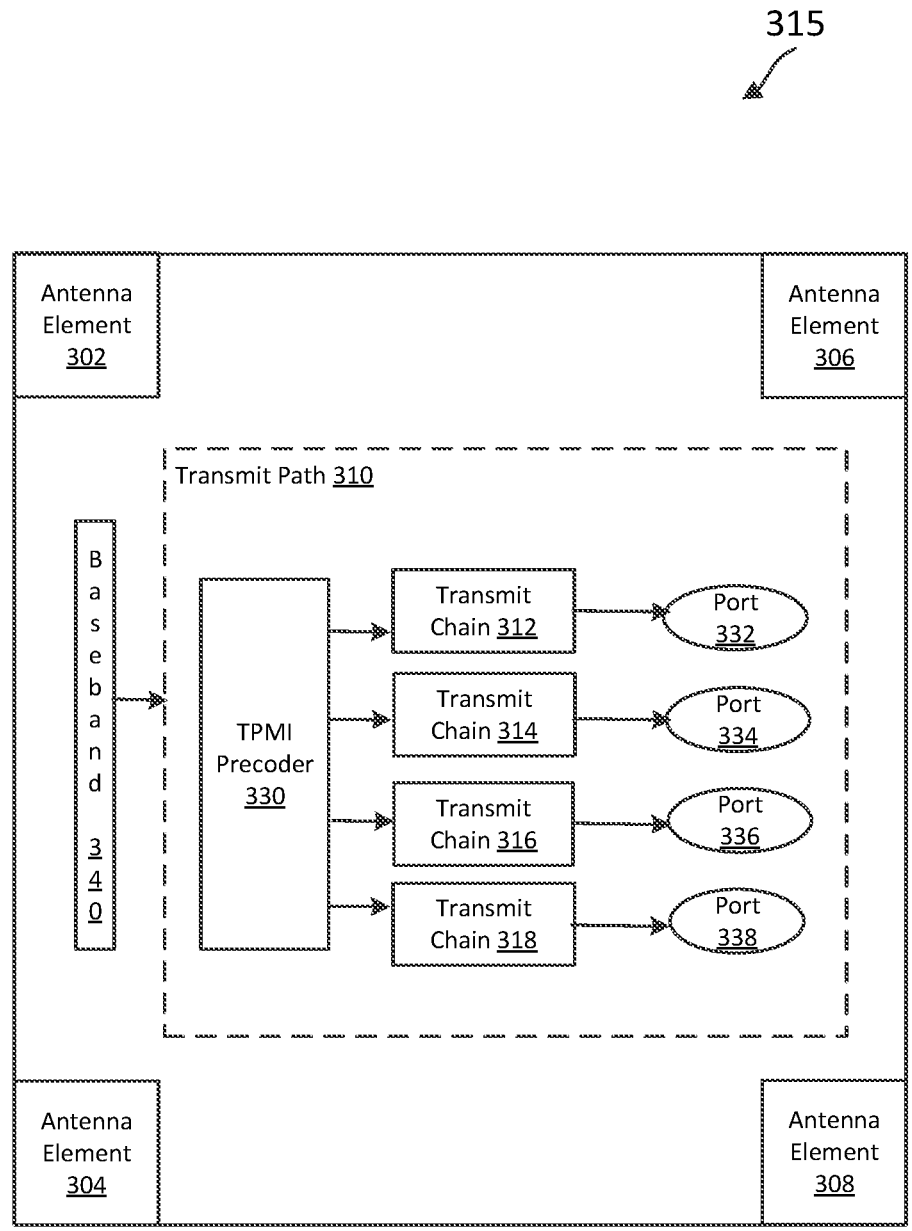
FIG. 3 illustrates an example of a user equipment (UE) according to some aspects of the present disclosure.

FIG. 3 illustrates an example of a UE 315 according to some aspects of the present disclosure. The UE 315 may be similar to the UEs 115 in FIG. 1 in the network 100. The UE 315 includes antenna elements 302, 304, 306, and 308. An antenna element may also be referred to as an antenna, an antenna port, or a port. Although the UE 315 is illustrated as having four antenna elements, it should be understood that in other examples, the UE 315 may include fewer antenna elements (e.g., 1, 2, or 3) or more antenna elements (e.g., 5, 6, 7, 8, etc.). A communication channel between a pair of nodes (e.g., a BS and a UE) includes not only the physical channel, but also radio frequency (RF) transceiver chains, for example, including antennas, low-noise amplifiers (LNAs), mixers, RF filters, and analog-to-digital (A/D) converters, and in-phase quadrature-phase (I/Q) imbalances, which may be different between different nodes and/or different antennas.

In the example illustrated in FIG. 3, the antenna elements 302, 304, 306, and 308 are located on different edges of the UE 315, thus creating diversity and providing for directional communication. The UE 315 may use at least one of the antenna elements 302, 304, 306, and/or 308 to transmit communication signals (e.g., SRS signals) to enable a BS (e.g., BS 105) to estimate an UL channel. The UE 315 includes a baseband 340 and a transmit path 310 for UL transmissions using one or more antenna elements. The baseband 340 may perform data encoding, cyclic-prefix (CP)-OFDM and/or discrete Fourier transform-spread-fast Fourier transform (DFT-s-FFT) modulation to generate a baseband signal. The transmit path 310 includes transmit chains 312, 314, 316, and 318. Although the UE 315 is illustrated as having four transmit chains, it should be understood that in other examples, the UE 315 may include fewer transmit chains (e.g., 1, 2, or 3) or more transmit chains (e.g., 5, 6, 7, 8, etc.). Each transmit chain may include a digital-to-analog converter (DAC), a mixer, and a power amplifier that converts a baseband signal to a radio frequency (RF) signal for transmission. Additionally, RF chains may be routed to multiple antennas, including all of the antennas, through phase shifters and/or switches. A transmit chain may also refer to an RF chain.

The UE 315 may sound a port 332, 334, 336, and/or 338 by sending an SRS using a combination of transmit chains. The ports 332, 334, 3236, and/or 338 may or may not have a one-to-one mapping to the antenna elements 302, 304, 306, and/or 308. When there is a one-to-one mapping, each antenna element 302, 304, 306, and/or 308 may map to one of the ports 332, 334, 336, and/or 338. When the ports 332, 334, 336, and/or 338 are logical ports or virtual ports, the UE may configure the transmit chains differently for different ports to produce signals with different powers and/or different direction. The UE can report a composite of the signals from the transmit chains to the BS as a virtual port by applying a transmit precoding matrix indicator (TPMI) precoder 330. Although the TPMI precoder 330 is illustrated in relation to the transmit chains, the TPMI precoder 330 may be applied in the baseband 340.

In conventional wideband precoding, the BS may transmit to the UE, a wideband precoding configuration indicating one precoder ("a common precoder") for all subbands across the PUSCH assignment. The UE receives the wideband precoding configuration and applies the common precoder for all subbands across the PUSCH assignment. In subband precoding, the BS may transmit to the UE, a subband precoding configuration indicating a plurality of precoders for a plurality of subbands, where each precoder of the plurality of precoders is configured for one subband of the plurality of subbands. The BS may configure the transform precoding by disabling or enabling it. A TPMI index or a matrix W may indicate the precoder for the UE to apply for a subband. The UE receives the subband precoding configuration and applies the plurality of precoders for the plurality of subbands across the PUSCH assignment.

The present application provides techniques for using a combination of wideband precoding and subband precoding. The BS may transmit a default precoder for a plurality of subbands and signal to the UE to override the default precoder with an override precoder for a subset of the plurality of subbands. Additionally, the BS may transmit the subband precoding configuration in, for example, DCI. The present application provides techniques for removing the ambiguity regarding the DCI size. Accordingly, the UE knows how many bits represent the subband precoding configuration.

Figure 4:
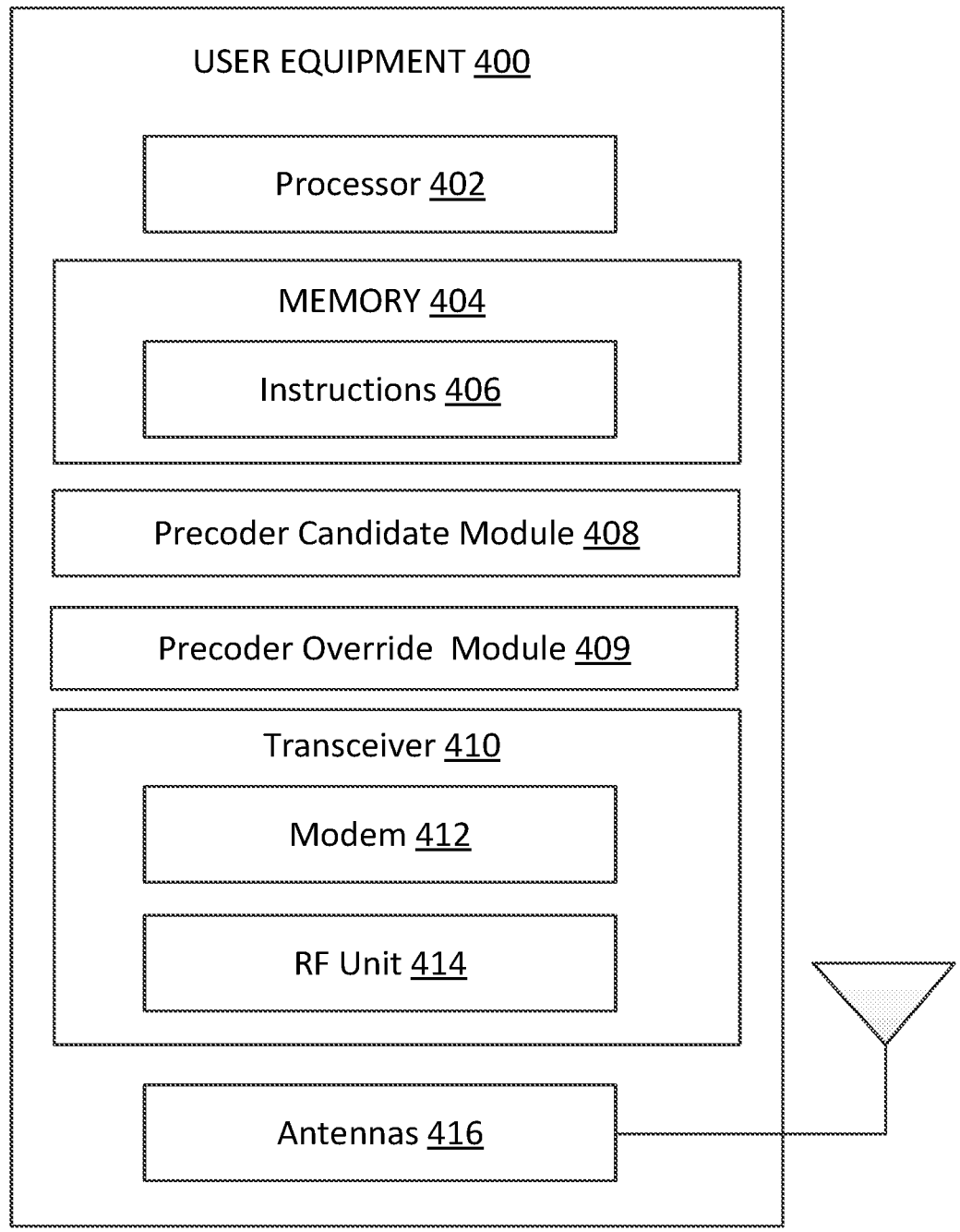
FIG. 4 is a block diagram of a UE according to some aspects of the present disclosure.

FIG. 4 is a block diagram of a UE 400 according to some aspects of the present disclosure. The UE 400 may be a UE 115 discussed above in FIG. 1 or a UE 315 discussed above in FIG. 3. As shown, the UE 400 may include a processor 402, a memory 404, a precoder candidate module 408, a precoder override module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115, 315 in connection with aspects of the present disclosure, for example, aspects of FIGS. 1-4 and 6-12. Instructions 406 may also be referred to as program code. The program code may be for causing a wireless communication device to perform these operations, for example, by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The UE 400 may include the precoder candidate module 408 without the precoder override module 409, the precoder override module 409 without the precoder candidate module 408, or both the precoder candidate module 408 and the precoder override module 409. The precoder candidate module 408 and/or the precoder override module 409 may be implemented via hardware, software, or combinations thereof. The precoder candidate module 408 and/or the precoder override module 409 may be implemented as a processor, circuit, and/or instructions 406 stored in the memory 404 and executed by the processor 402. In some instances, the precoder candidate module 408 and/or the precoder override module 409 can be integrated within the modem subsystem 412. The precoder candidate module 408 and/or the precoder override module 409 can be implemented by a combination of software components (e.g., executed by a DSP or a general processor) and hardware components (e.g., logic gates and circuitry) within the modem subsystem 412. The precoder candidate module 408 and/or the precoder override module 409 may be used for various aspects of the present disclosure, for example, aspects of FIGS. 1-4 and 6-12.

In some aspects, the precoder candidate module 408 may be configured to receive from a BS, a subband precoding configuration including a first number of bits and an indication of a common size for each subband of a set of subbands. The subband precoding configuration may indicate a plurality of precoders for the set of subbands and may be in accordance with aspects of FIGS. 6-9. The precoder candidate module 408 may be configured to select a plurality of precoders from a precoder candidate set based on the first number and the common size, where the precoder candidate set is based on an order of a spatial direction. The precoder candidate module 408 may be configured to transmit to the BS, a communication signal in the plurality of subbands using the plurality of precoders.

In some aspects, the precoder override module 409 may be configured to receive from a BS, a first precoder for a plurality of subbands and a first subband precoding configuration indicating a plurality of precoders for a subset of the plurality of subbands, where the plurality of precoders overrides the first precoder for the subset. The first subband precoding configuration may be in accordance with aspects of FIG. 10. Additionally, the precoder override module 409 may be configured to transmit to the BS, a communication signal in the plurality of subbands using the first precoder and the plurality of precoders.

As shown, the transceiver 410 may include the modem subsystem 412 and the RF unit 414. The transceiver 410 can be configured to communicate bi-directionally with other devices, such as the BSs 105 or BS 500. The modem subsystem 412 may be configured to modulate and/or encode the data from the memory 404 and/or the subband precoding module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115, 315 or a BS 105, 500. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices. The RF unit 414 may correspond to the RF transmit chains included within a transmit chain, as discussed in the present disclosure.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., subband precoding configuration, plurality of precoders from a precoder candidate set, a precoder for a plurality of subbands, an indication of a common size for each subband of a set of subbands, a default or wideband precoder, and/or an override precoder, etc.) to the precoder candidate module 408 and/or the precoder override module 409 for processing. The antennas 416 may include multiple antennas of similar or different designs in order to sustain multiple transmission links. The RF unit 414 may configure the antennas 416. The antenna(s) 416 may correspond to the antenna element(s) or port(s) discussed in the present disclosure.

In some aspects, the transceiver 410 may coordinate with the precoder candidate module 408 to receive a subband configuration including a first number of bits and an indication of a common size for each subband of a set of subbands and/or to transmit a communication signal in the plurality of subbands using the plurality of precoders. In some aspects, the transceiver 410 may coordinate with the precoder override module 409 to receive a first precoder for a plurality of subbands and a first subband precoding configuration indicating a plurality of precoders for a subset of the plurality of subbands and/or to transmit a communication signal in the plurality of subbands using the first precoder and the plurality of precoders.

In some aspects, the UE 400 can include multiple transceivers 410 implementing different radio access technologies (RATs) (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
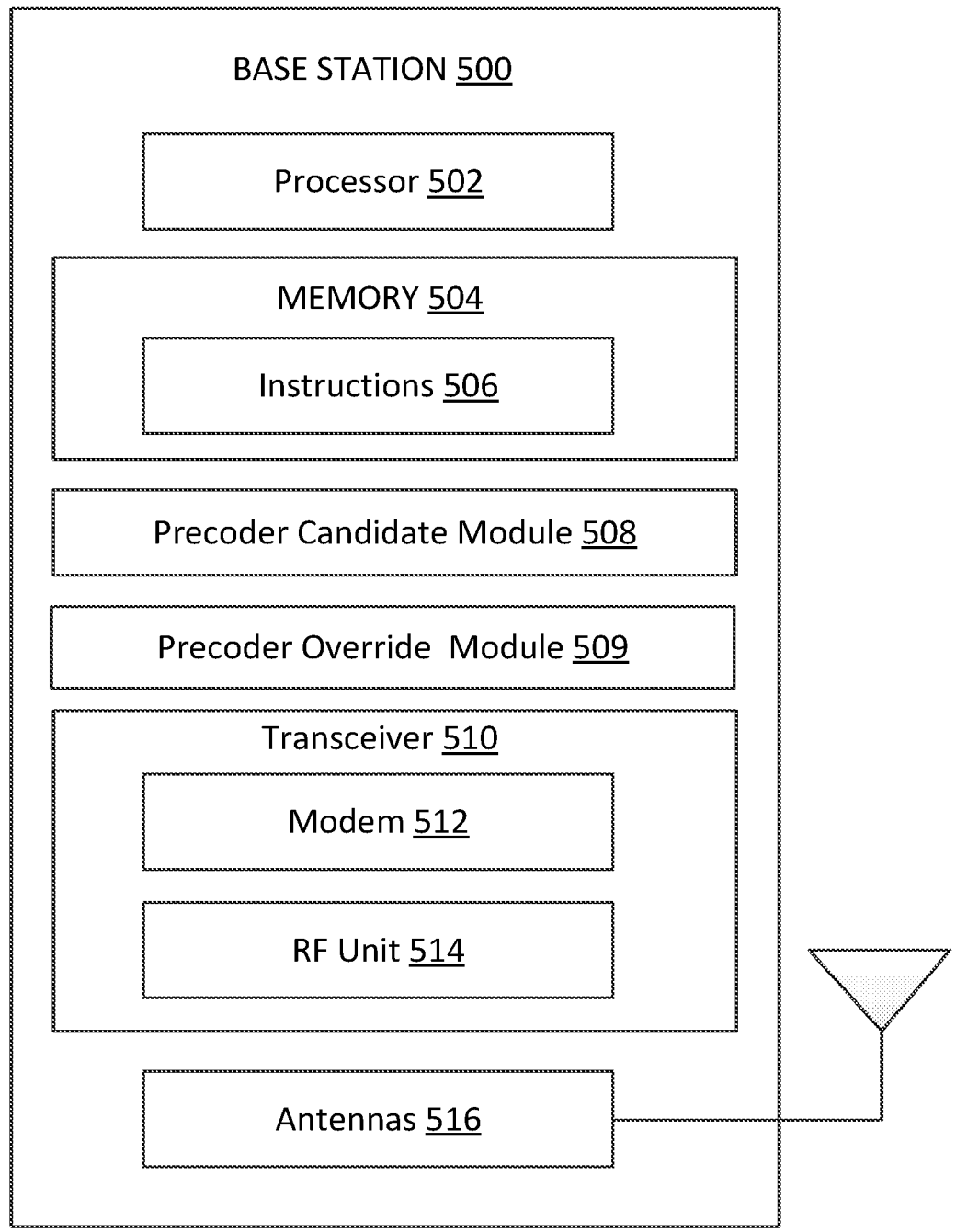
FIG. 5 is a block diagram of a base station (BS) according to some aspects of the present disclosure.

FIG. 5 is a block diagram of a BS 500 according to some aspects of the present disclosure. The BS 500 may be a BS 105 as discussed above in FIG. 1. As shown, the BS 500 may include a processor 502, a memory 504, a precoder candidate module 508, precoder override module 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-3, 5-10, 13, and 14. Instructions 506 may also be referred to as code, which may be interpreted broadly to include any type of computer-readable statement(s) as discussed above with respect to FIG. 4.

The BS 500 may include the precoder candidate module 508 without the precoder override module 509, the precoder override module 509 without the precoder candidate module 508, or both the precoder candidate module 508 and the precoder override module 509. The precoder candidate module 508 and/or the precoder override module 509 may be implemented via hardware, software, or combinations thereof. The precoder candidate module 508 and/or the precoder override module 509 may be implemented as a processor, circuit, and/or instructions 506 stored in the memory 504 and executed by the processor 502. In some instances, the precoder candidate module 508 and/or the precoder override module 509 can be integrated within the modem subsystem 512. The precoder candidate module 508 and/or the precoder override module 509 can be implemented by a combination of software components (e.g., executed by a DSP or a general processor) and hardware components (e.g., logic gates and circuitry) within the modem subsystem 512. The precoder candidate module 508 and/or the precoder override module 509 may be used for various aspects of the present disclosure, for example, aspects of FIGS. 1-3, 5-10, 13, and 14.

In some aspects, the precoder candidate module 508 may be configured to transmit to a UE, a subband configuration including a first number of bits and an indication of a common size for each subband of a set of subbands. The subband precoding configuration may indicate a plurality of precoders for the set of subbands and may be in accordance with aspects of FIGS. 6-9. The precoder candidate module 508 may be configured to select a plurality of precoders from a precoder candidate set based on the first number and the common size, the precoder candidate set being based on an order of a spatial direction. The precoder candidate module 508 may be configured to receive from the UE, a communication signal in the plurality of subbands based on the plurality of precoders.

In some aspects, the precoder override module 509 may be configured to transmit to a UE, a first precoder for a plurality of subbands and a first subband precoding configuration indicating a plurality of precoders for a subset of the plurality of subbands, where the plurality of precoders overrides the first precoder for the subset. The first subband precoding configuration may be in accordance with aspects of FIG. 10. Additionally, the precoder override module 509 may be configured to receive from the UE, a communication signal in the plurality of subbands based on the first precoder and the plurality of precoders.

As shown, the transceiver 510 may include the modem subsystem 512 and the RF unit 514. The transceiver 510 can be configured to communicate bi-directionally with other devices, such as the UEs 115, 315 and/or 400, a BS, and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., grants, resource allocations) from the modem subsystem 512 (on outbound transmissions) or of transmissions originating from another source such as a UE 115, 315 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices. The RF unit 514 may correspond to the RF transmit chains included within a transmit chain, as discussed in the present disclosure.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115, 315, or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., subband precoding configuration, plurality of precoders from a precoder candidate set, a precoder for a plurality of subbands, an indication of a common size for each subband of a set of subbands, a default or wideband precoder, and/or an override precoder, etc.) to the precoder candidate module 508 and/or the precoder override module 509 for processing. The antennas 516 may include multiple antennas of similar or different designs in order to sustain multiple transmission links.

In some aspects, the transceiver 510 may coordinate with the precoder candidate module 508 to transmit a subband configuration including a first number of bits and an indication of a common size for each subband of a set of subbands and/or to receive a communication signal in the plurality of subbands based on the plurality of precoders. In some aspects, the transceiver 510 may coordinate with the precoder override module 509 to transmit a first precoder for a plurality of subbands and a first subband precoding configuration indicating a plurality of precoders for a subset of the plurality of subbands and/or to receive a communication signal in the plurality of subbands based on the first precoder and the plurality of precoders.

In some aspects, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

The BS may transmit a subband precoding configuration in, for example, DCI. The DCI may indicate to the UE which precoder to apply for which subband. The UE may receive the DCI and determine, based on the DCI, which precoders to apply for which subbands. In some examples, the BS fixes the size of the subbands indicated in the subband precoding configuration. The size of a subband may be the number of RBs included in the subband.

Figure 6:
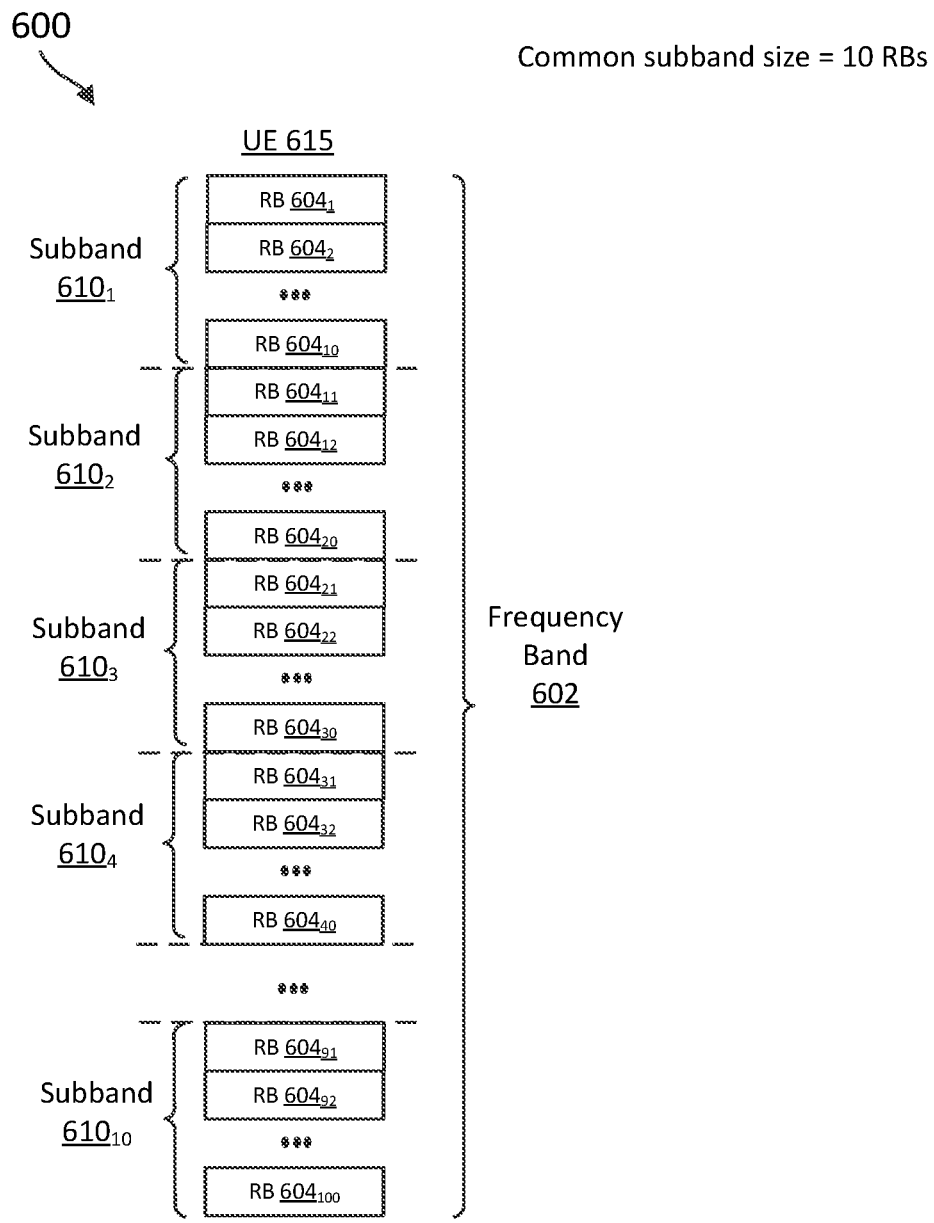
FIG. 6 illustrates a subband configuration scheme according to some aspects of the present disclosure.
Figure 7:
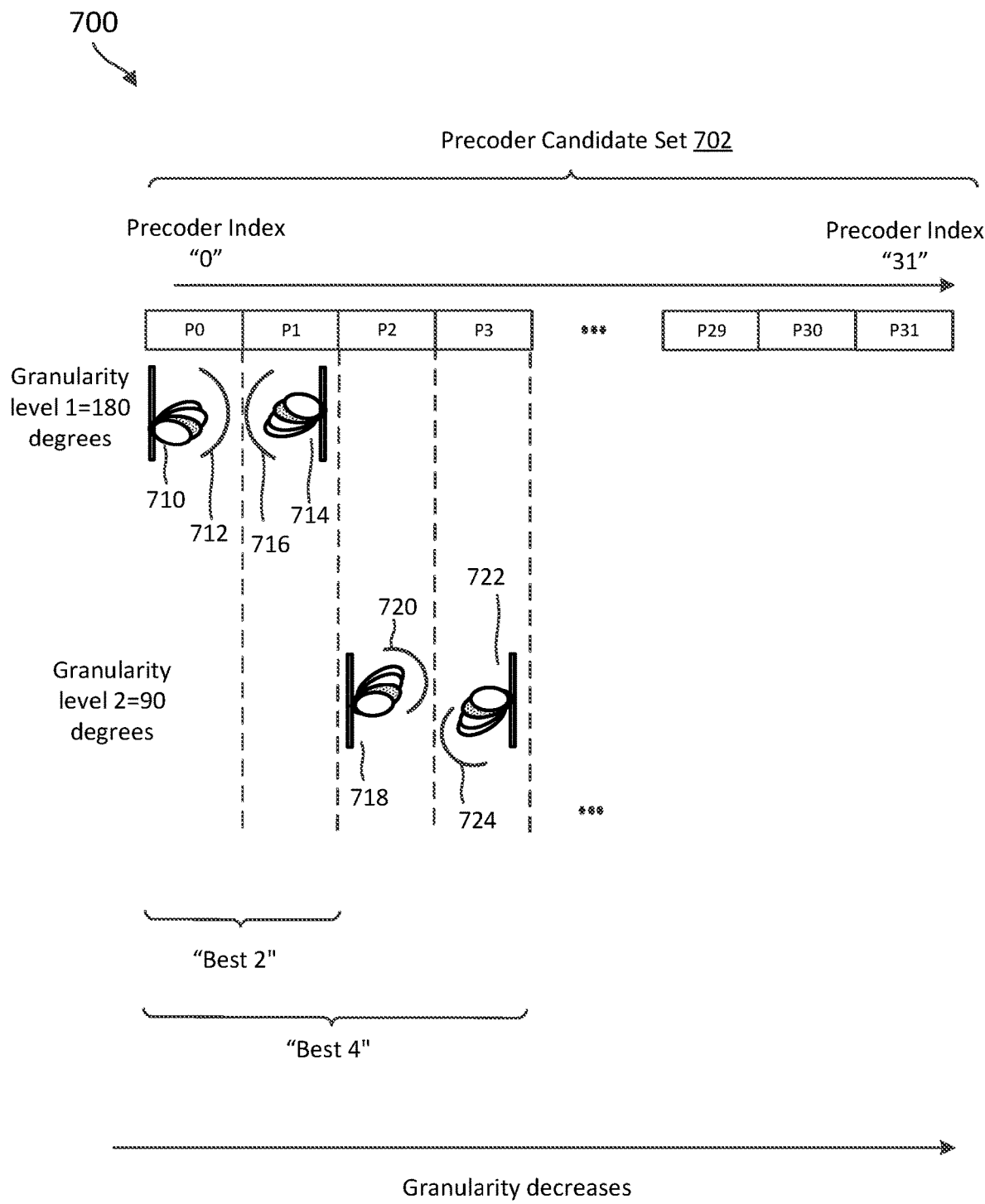
FIG. 7 illustrates a precoder candidate set according to some aspects of the present disclosure.

FIGS. 6, 7, 8A-8E, and 9 will be discussed in relation to each other to better understand concepts provided in the present disclosure. FIG. 6 illustrates a subband configuration scheme according to some aspects of the present disclosure. A subband configuration may include a set of subbands having a common size. The UE and/or the BS may select a plurality of precoders from a precoder candidate set for the set of subbands. FIG. 7 illustrates a precoder candidate set according to some aspects of the present disclosure. FIGS. 8A-8E illustrate subband precoding configurations for indicating the plurality of precoders for the set of subbands. FIG. 9 is a table of a codebook subset corresponding to the UE's and/or the BS's selection of the plurality of precoders according to some aspects of the present disclosure Referring to FIG. 6, the subband configuration scheme 600 may be employed by BSs such as the BSs 105, 500 and UEs such as the UEs 115, 315, 400 in a network such as the network 100 for communications. The subband configuration scheme 600 may have a fixed subband size, where all of the subbands in the set of subbands have a common subband size. In FIG. 6, a frequency band 602 includes 100 RBs $604_1$, $604_2$, ... $604_{100}$, and the BS may assign a PUSCH allocation including the 100 RBs to a UE 615 for transmissions. In other words, the BS may assign or schedule in the same PUSCH transmission, transmission resources in the form of RBs 604 to the UE 615 for UL transmissions in the network. The BS may partition the frequency band 602 into a set of subbands including subbands $610_1$, $610_2$, ... and $610_{10}$. Each of the subbands $610_1$, $610_2$, ... and $610_{10}$ includes the same number of RBs, which is 10 RBs in the example illustrated in FIG. 6. The subband $610_1$ includes RBs $604_1$, $604_2$, ... $604_{10}$, the subband $610_2$ includes RBs $604_{11}$, $604_{12}$, ... $604_{20}$, the subband $610_3$ includes RBs $604_{21}$, $604_{22}$, ... $604_{30}$, the subband $610_4$ includes RBs $604_{31}$, $604_{32}$, ... $604_{40}$, ..., and the subband $610_{10}$ includes RBs $604_{91}$, $604_{92}$, ... $604_{100}$. It should be understood that the common subband size may be any suitable number of RBs (e.g., greater than or fewer than 10 RBs).

A BS may transmit to a UE, an indication of the common subband size for the set of subbands $610_1$, $610_2$, ... and $610_{10}$. In an example, the BS may transmit to the UE via RRC, a signal indicating the common subband size (e.g., 10 RBs) and may schedule the UE to transmit in PUSCH using the set of subbands. The BS may also indicate to the UE, usage of a particular precoder for each of the subbands of the set. The UE may receive the signal from the BS and determine that the common subband size of each subband used for the PUSCH assignment is 10 RBs, as shown in the example illustrated in FIG. 6.

Additionally, the BS may transmit a subband precoding configuration including T bits to the UE, where T is a whole number greater than zero and represents the number of bits for indicating a plurality of precoders for the set of subbands $610_1$, $610_2$, ... and $610_{10}$. In an example, T represents a subband precoding configuration and is fixed. The BS may transmit to the UE, DCI including a DCI field having T bits for storing the subband precoding configuration. Additionally, the DCI may indicate the set of subbands $610_1$, $610_2$, ... and $610_{10}$ and the number of RBs in a PUSCH allocation for the set of subbands $610_1$, $610_2$, ... and $610_{10}$. The UE may receive the DCI and determine, based on the DCI, the number of RBs in a PUSCH allocation and the number of bits for indicating the plurality of precoders for the set of subbands.

In some examples, the common subband size and the number of bits for indicating the subband precoding configuration are fixed. The number of bits (V) for indicating a precoder per subband, however, may be variable and may depend on, for example, the common subband size for a PUSCH assignment, the number of RBs allocated in the PUSCH assignment, and/or the number of bits (T) for indicating the plurality of precoders for the set of subbands. To determine the number of bits (V) for indicating a precoder per subband, the BS and/or the UE may apply Equations (1) and (2) below.

To determine the number of subbands in the set of subbands, the BS and/or the UE may apply the following Equation (1) below:

$$S = \text{ceiling}((\text{\# of RBs in a PUSCH assignment})/(\text{common subband size for the PUSCH assignment})) \quad (\text{Eq. 1}),$$

where S represents a total number of subbands for the PUSCH assignment. In FIG. 6, the number of RBs in the PUSCH assignment is 100 RBs, and the common subband size is 10 RBs. Accordingly, the total number of subbands for the PUSCH assignment is 10 subbands (S=(100/10)=10). In this example, the set of 10 subbands includes the subbands $610_1$, $610_2$, ... and $610_{10}$.

To determine the number of bits for indicating a precoder per subband, the BS and/or the UE may apply the following Equation (2) below:

$$V = ((T \text{ bits for indicating a plurality of precoders for the set of subbands})/S) \quad (\text{Eq. 2}),$$

where S represents a total number of subbands for the PUSCH assignment (see Equation (1) above), T is a whole number greater than one, and V represents the number of bits for indicating a precoder per subband of the set of subbands. The BS and/or the UE may determine, based on V, which precoders to select from a precoder candidate set and how many precoders to select.

FIG. 7 illustrates a precoder candidate set 702 according to some aspects of the present disclosure. A specification or standard may define a maximum candidate size for the precoder candidate set 702. In the example illustrated in FIG. 7, the maximum candidate size is 32. The precoder candidate set 702 is based on an order of a spatial direction, and a spatial granularity of the precoders decreases from a beginning to an end of the ordered precoder candidate set. Precoding may include beamforming in relation to directional transmissions. Beamforming techniques may be used to increase the signal level received by a device. A beamformer combines energy over its aperture, obtaining a certain antenna gain in a given direction while having attenuation in others. Each of the BS and the UE may steer its energy in a particular direction.

The BS and/or the UE may select the first $2^V$ precoders listed in the ordered precoder candidate set 702, where V represents the number of bits for indicating a precoder per subband of the set of subbands (see Equation (2) above). Each precoder of the precoder candidate set 702 may point to one direction within a 360-degree space. The more precoders the UE selects for subband precoding, the finer the granularity and the narrower the beam pattern. The granularity may refer to the spatial angle separation between the precoders. For example, precoders 710 and 714 located at granularity level 1 may be coarser and cover a larger spatial direction and/or area than precoders 718 and 722 located at granularity level 2. Conversely, precoders 718 and 722 may be finer than and may also cover a smaller spatial direction and/or area than the precoders located at granularity level 1. A precoder may dictate the beam width. More details regarding the granularity of the precoders and selection of the plurality of precoders in relation to FIGS. 6, 7, and 8A-8E are discussed below.

In the following examples, T=20 bits for indicating a plurality of precoders for a set of subbands used in a PUSCH assignment, and the common subband size is 10 RBs for the PUSCH assignment.

In an example, a PUSCH assignment includes 200 RBs. By applying Equation (1), the BS and/or the UE may determine that the total number of subbands in the PUSCH assignment is 20 (S=(200/10)=20). By applying Equation (2), the BS and/or the UE may determine that V=1 (V=(20/20)=1). Here, 1 bit is used to indicate a precoder for each subband of the set of 20 subbands. If V=1, the BS and/or the UE may select the first $2^V$ precoders from the precoder candidate set 702, which are the first two precoders 710 and 714. With 1 bit, 2 different combinations are possible (e.g., 0 and 1) and the subband precoding configuration may include 20 bits, with each 1-bit value of the 20-bit value indicating 1 precoder out of the 2 selected precoders for each subband of the set of 20 subbands.

Figure 8A:
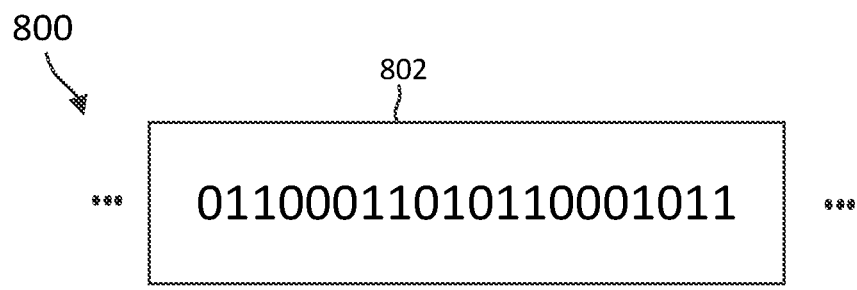
FIGS. 8A-8E are subband precoding configurations according to some aspects of the present disclosure.

FIG. 8A is an example subband precoding configuration for indicating a plurality of precoders for the set of 20 subbands. In FIG. 8A, the BS may transmit to the UE, DCI 800 including a DCI field storing a subband precoding configuration 802 including a 20-bit value "01100011010110001011." The subband precoding configuration 802 may indicate a plurality of precoders for the set of 20 subbands. The BS and/or the UE may traverse the subband precoding configuration 802 by identifying each bit group including V bits from the most significant bit (MSB) to the least significant bit (LSB), and determine, based on the value of the bit group, which precoder to use for a subband. In an example, a bit value of 0 may indicate that the precoder 710 should be used for a subband, and a bit value of 1 may indicate that the precoder 714 should be used for the subband. It should also be understood that the BS and/or the UE may traverse the subband precoding configuration 802 from the LSB to the MSB and determine, based on the traversal, the bit groups.

Referring to back to FIG. 7, the UE and/or the BS may select the precoders 710 and 714. The precoder 710 corresponds to a precoder index P0 and points to degree 0 for transmitting beams corresponding to an angle 712. The angle 712 may be 180 degrees, and thus the precoder 710 may cover a 180-degree sector with a first beam pattern. The UE may transmit a communication signal in a first subband (of a set of 20 subbands) using the precoder 710. The precoder 714 corresponds to a precoder index P1 and points to degree 180 for transmitting beams corresponding to an angle 716. The angle 716 may be 180 degrees, and thus the precoder 714 may cover a 180-degree sector with a second beam pattern. The UE may transmit a communication signal in a second subband (of a set of 20 subbands) using the precoder 714. If the UE uses precoders 710 and 714, the precoder 710 covers one-half of the 360-degree space, and the precoder 714 covers the other one-half of the 360-degree space. Accordingly, the UE may cover the entire 360-degree space by using the precoders 710 and 714. The UE may transmit a communication signal in the set of 20 subbands using the precoders 710 and 714. The BS may receive from the UE, the transmitted communication signal in the set of 20 subbands based on the precoders 710 and 714.

In another example, a PUSCH assignment includes 100 RBs. By applying Equation (1), the BS and/or the UE may determine that the total number of subbands in the PUSCH assignment is 10 (S=(100/10)=10). By applying Equation (2), the BS and/or the UE may determine that V=2 (V=(20/10)=2). Here, 2 bits are used to indicate a precoder for each subband of the set of 10 subbands (e.g., subbands $610_1$, $610_2$, ... and $610_{10}$ in FIG. 6). If V=2, the BS and/or the UE may select the first $2^V$ precoders from the precoder candidate set 702, which are the first four precoders 710, 714, 718, and 722 in FIG. 7. With 2 bits, 4 different combinations are possible (e.g., 00, 01, 10, and 11) and the subband precoding configuration may include 20 bits, with each 2-bit value of the 20-bit value indicating 1 precoder out of the 4 selected precoders for each subband of the set of 10 subbands.

Figure 8B:
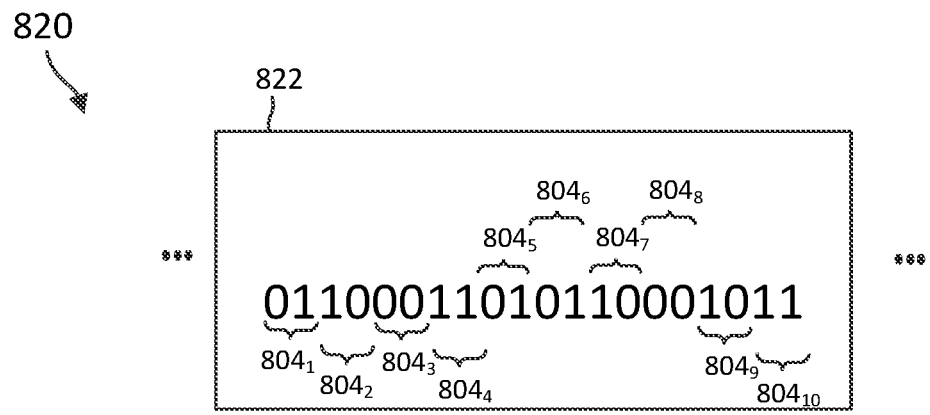

FIG. 8B is an example subband precoding configuration for indicating a plurality of precoders for the set of 10 subbands. In FIG. 8B, the BS may transmit to the UE, DCI 820 including a DCI field storing a subband precoding configuration 822 including a 20-bit value "01100011010110001011." The subband precoding configuration 822 may indicate a plurality of precoders for the set of 10 subbands $610_1$, $610_2$, ... and $610_{10}$. The BS and/or the UE may traverse the subband precoding configuration 822 by identifying each bit group 804 including V bits and determine, based on the value of the bit group, which precoder to use for a subband. The BS and/or the UE may traverse the subband precoding configuration 822 from the MSB to the LSB or from the LSB to the MSB. Additionally, the bit groups are adjacent to each other and the bits within a bit group are adjacent to each other. In an example, a bit group "00" may indicate that the precoder 710 should be used for a subband, a bit group "01" may indicate that the precoder 714 should be used for the subband, a bit group "10" may indicate that the precoder 718 should be used for the subband, and a bit group "11" may indicate that the precoder 722 should be used for the subband. In the example illustrated in FIG. 8B, the UE may transmit a communication signal in a subband $610_1$ using the precoder 714 based on a first bit group "01" $804_1$, in a subband $610_2$ using the precoder 718 based on a second bit group "10" $804_2$, in a subband $610_3$ using the precoder 710 based on a third bit group "00" $804_3$, in a subband $610_4$ using the precoder 722 based on a fourth bit group "11" $804_4$, and so on. The BS may receive from the UE, the communication signal in the set of 10 subbands $610_1$, $610_2$, ... and $610_{10}$ based on the plurality of precoders indicated by the subband precoding configuration 822.

Referring to back to FIG. 7, the UE and/or the BS may select the precoders 710, 714, 718, and 722. The precoders 710 and 714 were discussed above. The precoder 718 corresponds to a precoder index P2 and points to degree 90 for transmitting beams corresponding to an angle 720. The angle 720 may be 90 degrees, and thus the precoder 718 may cover a 90-degree sector with a third beam pattern. The UE may transmit a communication signal in a first subband (of a set of 10 subbands) using the precoder 718. The precoder 722 corresponds to a precoder index P3 and points to degree 270 for transmitting beams corresponding to an angle 724. The angle 724 may be 90 degrees, and thus the precoder 722 may cover a 90-degree sector with a fourth beam pattern. The UE may transmit a communication signal in a second subband (of a set of 10 subbands) using the precoder 722.

If the UE uses precoders 718 and 722 in addition to the precoders 710 and 714, the precoder 718 covers one-fourth of the 360-degree space, and the precoder 722 covers in the opposite direction another one-fourth of the 360-degree space. The precoders 718 and 722 are located at granularity level 2, and the UE may cover the entire 360-degree space by using the precoders 710 and 714 in addition to the precoders 718 and 722, which may provide for finer granularity than using only the precoders 710 and 714. The UE may transmit a communication signal in the set of 10 subbands (e.g., subbands $610_1$, $610_2$, . . . and $610_{10}$) using the plurality of precoders (e.g., precoders 710, 714, 718, and 722). The BS may receive from the UE, the transmitted communication signal in the set of 10 subbands based on the precoders 710, 714, 718, and 722.

In another example, a PUSCH assignment includes 50 RBs. By applying Equation (1), the BS and/or the UE may determine that the total number of subbands in the PUSCH assignment is 5 (S=(50/10)=5). By applying Equation (2), the BS and/or the UE may determine that V=4 (V=(20/5)=4). Here, 4 bits are used to indicate a precoder for each subband of the set of 5 subbands $610_1$, $610_2$, . . . and $610_5$. If V=4, the BS and/or the UE may select the first $2^V$ precoders from the precoder candidate set 702, which are the first sixteen precoders in FIG. 7 (not all sixteen precoders shown). With 4 bits, 16 different combinations are possible (e.g., 0000, 0001, 0010, 0011, etc.) and the subband precoding configuration may include 20 bits, with each 4-bit value of the 20-bit value indicating 1 precoder out of the 16 selected precoders for each subband of the set of 5 subbands.

Figure 8C:
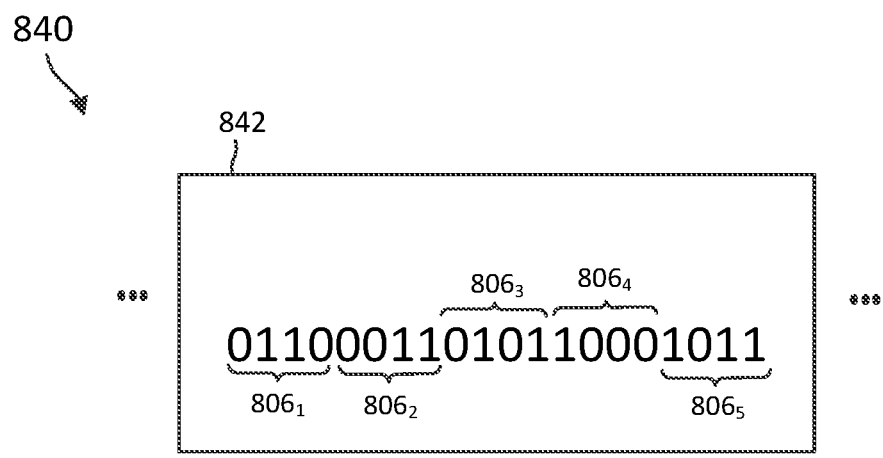

FIG. 8C is an example subband precoding configuration for indicating a plurality of precoders for the set of 5 subbands. In FIG. 8C, the BS may transmit to the UE, DCI 840 including a DCI field storing a subband precoding configuration 842 including a 20-bit value "01100011010110001011." The subband precoding configuration 842 may indicate a plurality of precoders for the set of 5 subbands $610_1$, $610_2$, . . . and $610_5$. The BS and/or the UE may traverse the subband precoding configuration 842 by identifying each bit group 806 including V bits and determine, based on the value of the bit group, which precoder to use for a subband. In an example, a bit group "0110" $806_1$ may indicate that a precoder corresponding to a precoder index "P6" be used for a subband, a bit group "0011" $806_2$ may indicate that a precoder corresponding to a precoder index "P3" be used for the subband, a bit group "0101" $806_3$ may indicate that a precoder corresponding to a precoder index "P5" be used for the subband, a bit group "1000" $806_4$ may indicate that a precoder corresponding to a precoder index "P8" be used for the subband, and a bit group "1011" $806_5$ may indicate that a precoder corresponding to a precoder index "P11" be used for the subband.

In the example illustrated in FIG. 8C, the UE may transmit a communication signal in a subband $610_1$ using the precoder corresponding to a precoder index "P6" based on the bit group "0110" $806_1$, in a subband $610_2$ using the precoder corresponding to a precoder index "P3" based on the bit group "0011" $806_2$, in a subband $610_3$ using the precoder corresponding to a precoder index "P5" based on the bit group "0101" $806_3$, in a subband $610_4$ using the precoder corresponding to a precoder index "P8" based on the bit group "1000" $806_4$, and in a subband $610_5$ using the precoder corresponding to a precoder index "P11" based on the bit group "1011" $806_5$. The BS may receive from the UE, the communication signal in the set of 5 subbands $610_1$, $610_2$, . . . and $610_5$ based on the plurality of precoders indicated by the subband precoding configuration 842.

In another example, a PUSCH assignment includes 40 RBs. By applying Equation (1), the BS and/or the UE may determine that the total number of subbands in the PUSCH assignment is 4 (S=(40/10)=4). By applying Equation (2), the BS and/or the UE may determine that V=5 (V=(20/4)=5). Here, 5 bits are used to indicate a precoder for each subband of the set of 4 subbands $610_1$, $610_2$, $610_3$, and $610_4$. If V=5, the BS and/or the UE may select the first $2^V$ precoders from the precoder candidate set 702, which includes the entire set of 32 precoders in the precoder candidate set 702. The UE may perform similar actions as discussed above to transmit a communication signal in a set of subbands using one of the 32 precoders indicated by the bit groups in the subband precoding configuration, and the BS may perform similar actions as discussed above to receive the communication signal in the set of subbands based on at least one of the 32 precoders in accordance with the subband precoding configuration.

Although the above examples illustrate scenarios in which the quotient of the total number of RBs in a PUSCH assignment and the common size is a whole number, with a remainder of 0, it should be understood that in other examples, the quotient may have a remainder. For example, if the PUSCH assignment is 60 RBs, the common subband size is 10 RBs, and the first number of bits for indicating a plurality of precoders for the set of subbands is 20, the number of bits for indicating a precoder per subband of the set of subbands is a fraction (V=20/6=3⅓), where the quotient is 3 and the remainder is 2. In this example, the number of bits indicating a precoder per subband may be different. For example, for the 6 subbands, the number of bits per subband may be [3, 3, 3, 3, 4, 4] or [4, 4, 3, 3, 3, 3]. A specification may define whether to apply a floor operation or a ceiling operation for specifying which subband precoder configuration to use.

Figure 8D:
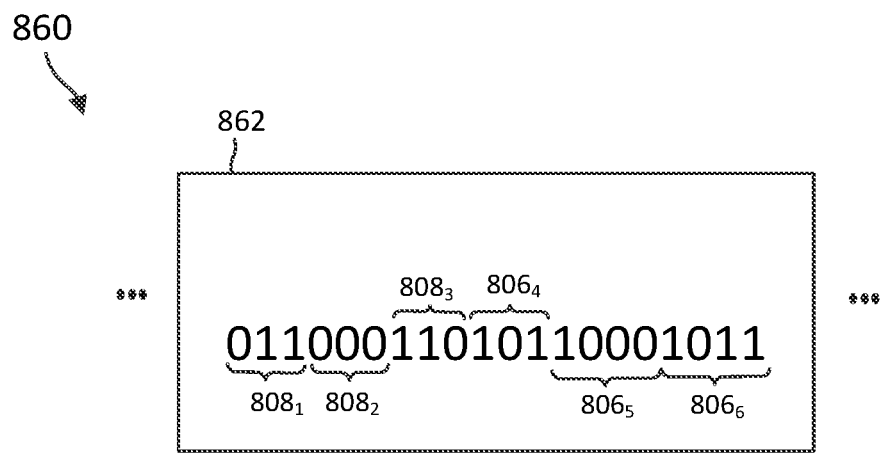

If the floor operation is applied, the number of bits used for indicating a precoder per subband is placed in ascending order, and accordingly the subband precoder configuration is [3, 3, 3, 3, 4, 4] for the set of subbands. FIG. 8D is an example subband precoding configuration in which the floor operation is applied. In FIG. 8D, the BS may transmit to the UE, DCI 860 including a DCI field storing a subband precoding configuration 862 including a 20-bit value "01100011010110001011." The BS and/or the UE may traverse the subband precoding configuration 862 and determine, based on the traversal, a first set of bit groups having Q bits (e.g., Q=3) and a second set of bit groups having Q+1 bits (e.g., Q+1=4), where Q is the quotient. In FIG. 8D, the first set of bit groups includes a bit group "011" $808_1$, which includes the first three bits, a bit group "000" $808_2$, which includes the next three bits, a bit group "110" $808_3$, which includes the next three bits, and a bit group "101" $808_4$, which includes the next three bits. The second set of bits groups includes a bit group "1000" $808_5$, which includes the next four bits after the previous bit group, and a bit group "1011" 808₆, which includes the next four bits. Each bit group indicates a precoder for a subband, and the UE transmits a communication signal in the set of 6 subbands using the plurality of precoders indicated by the first and second bit groups. The BS receives the communication signal in the set of 6 subbands based on the plurality of precoders indicated by the first and second bit groups.

Figure 8E:
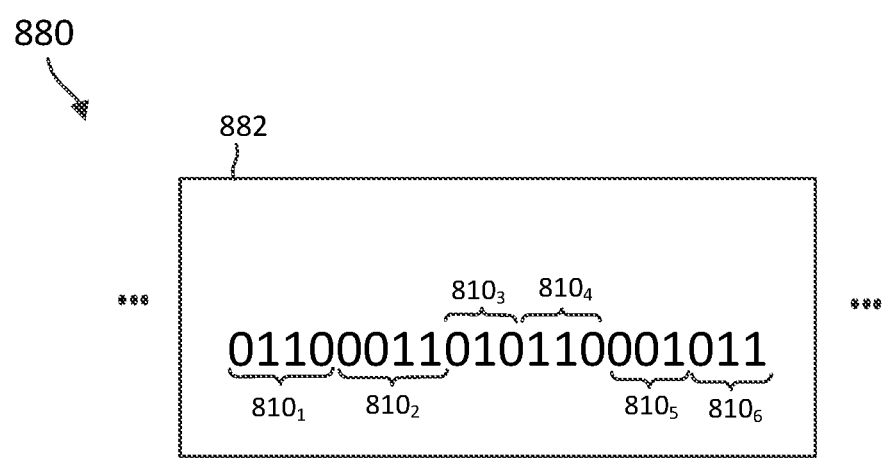

If the ceiling operation is applied, the number of bits used for indicating a precoder per subband is placed in descending order, and accordingly the subband precoder configuration is [4, 4, 3, 3, 3, 3] for the set of subbands. FIG. 8E is an example subband precoding configuration in which the ceiling operation is applied. In FIG. 8E, the BS may transmit to the UE, DCI 880 including a DCI field storing a subband precoding configuration 882 including a 20-bit value "01100011010110001011." The BS and/or the UE may traverse the subband precoding configuration 882 and determine, based on the traversal, a first set of bit groups having Q bits (e.g., Q=3) and a second set of bit groups having Q+1 bits (e.g., Q+1=4), where Q is the quotient. In FIG. 8E, the first set of bit groups includes a bit group "0110" 810₁, which includes the first four bits, a bit group "0011" 810₂, which includes the next four bits. The second set of bits groups includes a bit group "010" 810₃, which includes the next three bits after the previous bit group, a bit group "110" 810₄, which includes the next three bits, a bit group "001" 810₅, which includes the next three bits, and a bit group "011" 810₆, which includes the next three bits. Each bit group indicates a precoder for a subband, and the UE transmits a communication signal in the set of 6 subbands using the plurality of precoders indicated by the first and second bit groups. The BS receives the communication signal in the set of 6 subbands based on the plurality of precoders indicated by the first and second bit groups.

As discussed, the precoders in the precoder candidate set 702 are in an order such that a granularity of the precoders decreases from a beginning to an end of the precoder candidate set. As the number of precoders used by the UE for subband precoding increases, the BS and/or the UE may select precoders with a finer degree of granularity as the BS and/or the UE traverses the precoder candidate set 702. The precoders located at the beginning of the precoder candidate set 702 cover a larger spatial area compared to the precoders located at or near the end of the precoder candidate set. For example, precoders corresponding to precoder indices P4, P5, P6, and P7 may point to a degree 45, a degree 135, a degree 225, and a degree 315, respectively, for transmitting beams and may cover a 45-degree sector.

Additionally, if the number of subbands for a PUSCH assignment is large, the precoders selected for a subband may cover a larger spatial area. With a common subband size and as the number of subbands increases for different PUSCH assignments, the BS and/or the UE may use a fewer number of bits for indicating a precoder per subband. Conversely, if the number of subbands for a PUSCH assignment is small, the precoders selected for a subband may cover a smaller spatial area with finer granularity. With a common subband size and as the number of subbands decreases for different PUSCH assignments, the BS and/or the UE may use more bits for indicating a precoder per subband.

FIG. 9 is a table 900 of a codebook subset corresponding to the UE's and/or the BS's selection of the plurality of precoders according to some aspects of the present disclosure. The table 900 stores a precoding matrix W for single-layer transmission for a UE having two antenna ports. In FIG. 9, the BS and/or the UE may select the precoders 910, 914, 918, and/or 922. The precoders 910, 914, 918, and 922 in FIG. 9 may correspond to the precoders 710, 714, 718, and 722 in FIG. 7, respectively. For example, the precoder 910 may correspond to a matrix $$\begin{bmatrix} 1 \\ 1 \end{bmatrix}$$

(indicated by TPMI index 2) and may point to 0 degrees, and the precoder 914 may correspond to a matrix $$\begin{bmatrix} 1 \\ -1 \end{bmatrix}$$

(indicated by TPMI index 3) and may point to 180 degrees. Accordingly, the UE may cover the entire 360-degree space by using the precoders 910 and 914 (similar to the precoders 710 and 714 in FIG. 7). Additionally, the precoder 918 may correspond to a matrix $$\begin{bmatrix} 1 \\ j \end{bmatrix}$$

(indicated by TPMI index 4) and may point to 90 degrees, and the precoder 922 may correspond to a matrix $$\begin{bmatrix} 1 \\ -j \end{bmatrix}$$

(indicated by TPMI index 5) and may point to 230 degrees. Accordingly, the UE may cover the entire 360-degree space with finer granularity by using the precoders 918 and 922 (similar to the precoders 718 and 722 in FIG. 7).

Accordingly, the present disclosure provides techniques for providing a fixed number of bits for indicating a subband precoding configuration. Additionally, the present disclosure provides techniques for combining the wideband precoding with subband precoding. In some examples, the BS may apply a default precoder to a plurality of subbands. The default precoder may also be referred to as a wideband precoder. Rather than apply the default precoder to a subset of the plurality of subbands, the BS may override the default precoder with a plurality of precoders for the subset of subbands.

Figure 10:
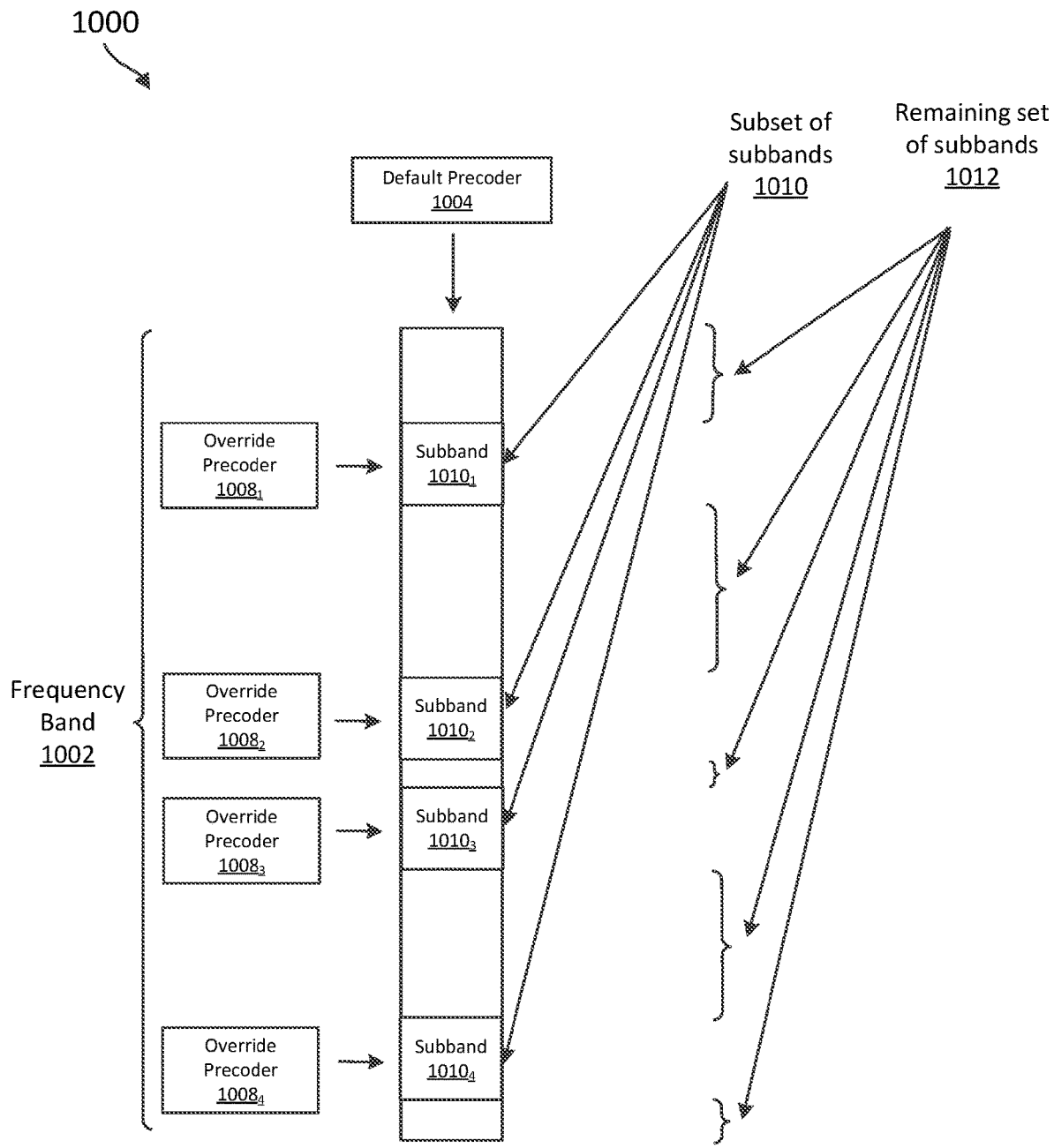
FIG. 10 illustrates a subband precoder configuration scheme including a default precoder and one or more overriding precoders according to some aspects of the present disclosure.

FIG. 10 illustrates a subband precoder configuration scheme 1000 including a default precoder and one or more overriding precoders according to some aspects of the present disclosure. The subband precoder configuration scheme 1000 may be employed by BSs such as the BSs 105, 500 and UEs such as the UEs 115, 315, 400 in a network such as the network 100 for communications.

A BS may partition a frequency band 1002 into a plurality of subbands including a subset of subbands 1010 and a remaining set of subbands 1012. The subset of subbands 1010 includes subbands 1010₁, 1010₂, 1010₃, and 1010₄, and the remaining set of subbands 1012 includes the subbands that are within the frequency band 1002, but not part of the subset of subbands 1010. The subset of subbands 1010 is mutually exclusive of the remaining set of subbands 1012. The BS may schedule the UE to transmit in PUSCH using the plurality of subbands. The BS may transmit to the UE, a signal indicating the default precoder 1004 for a plurality of subbands including the subset of subbands 1010 and the remaining set of subbands 1012.

Additionally, the BS may transmit a first subband precoding configuration indicating a plurality of override precoders $1008_1$, $1008_2$, $1008_3$, and $1008_4$ for the subbands $1010_1$, $1010_2$, $1010_3$, and $1010_4$, respectively, where the plurality of override precoders $1008_1$, $1008_2$, $1008_3$, and $1008_4$ overrides the default precoder 1004 for the subset of subbands 1010. In an example, the BS may transmit to the UE via RRC, a signal indicating the subset of subbands 1010. In another example, the BS may transmit to the UE via DCI, a signal indicating the subset of subbands 1010. The UE may receive from the BS via RRC, the signal indicating the subset of subbands 1010. In an example, the BS transmits DCI including a first DCI field indicating the default precoder 1004 and a second DCI field indicating the plurality of override precoders for the subset of subbands 1010. The number of subbands in the subset of subbands 1010 may be RRC-configured by the BS. If the BS transmits 5 bits to indicate a precoder per subband, the BS may transmit five bits for the default precoder 1004 and 5 bits for each subband of the subset of subbands 1010. In this example, the BS may transmit 25 bits (5 bits for the default precoder 1004 and 20 bits for the subset of subbands 1010).

Additionally, the BS may also transmit to the UE, a location of each subband of the subset of subbands 1010, which is discussed in more detail further below. The subset of subbands 1010 may be contiguous or distributed across the frequency band 1002. If the subset of subbands 1010 is distributed, they may be uniformly or non-uniformly distributed in the PUSCH allocated RBs.

The selection of the subset of subbands 1010 may be based on the UL channel estimation and interference estimation at the BS. From the UL channel estimation and interference estimation, the BS may select the subset of subbands 1010 ("the best subbands") having the strongest channel energy and smallest interference. Furthermore, for each of the selected subbands, the BS may select the best precoder for the respective subband.

The UE may receive the default precoder 1004 for the frequency band 1002 and the first subband precoding configuration. Based on receiving the default precoder 1004 for the frequency band 1002 and the first subband precoding configuration with the override information, the UE may apply the plurality of override precoders $1008_1$, $1008_2$, $1008_3$, and $1008_4$ to the subset of subbands $1010_1$, $1010_2$, $1010_3$, and $1010_4$, respectively. In this example, the UE may apply the default precoder 1004 across the entire PUSCH assignment, except for the subset of subbands 1010 includes subbands $1010_1$, $1010_2$, $1010_3$, and $1010_4$. The UE does not apply the default precoder 1004 to the subbands $1010_1$, $1010_2$, $1010_3$, and $1010_4$. Accordingly, the UE may transmit a communication signal in the subset of subbands $1010_1$, $1010_2$, $1010_3$, and $1010_4$ using the plurality of override precoders $1008_1$, $1008_2$, $1008_3$, and $1008_4$, respectively, and in the remaining set of subbands 1012 using the default precoder 1004.

The BS may receive the communication signal in the subset of subbands $1010_1$, $1010_2$, $1010_3$, and $1010_4$ based on the plurality of override precoders $1008_1$, $1008_2$, $1008_3$, and $1008_4$, respectively, and in the remaining set of subbands 1012 based on the default precoder 100. The BS may signal the location of the subset of subbands 1010 in a variety of ways. In some aspects, the BS may signal the location of the subset of subbands 1010 by using a Z-bit bitmap, where Z represents the number of subbands in the UE's PUSCH assignment. The bitmap may store a bit value for each subband of the frequency band 1002, the bit value corresponding to the respective subband. The bit value may indicate whether the corresponding subband should be overridden by an override precoder. For example, a bit value of zero may indicate that the default precoder 1004 is used for the corresponding subband and a bit value of one may indicate that the default precoder 1004 is not used for the corresponding subband, but is overridden by another precoder (e.g., override precoder 1008). The BS may transmit the Z-bit bitmap to the UE.

The UE may receive the Z-bit bitmap and determine, based on the values in the Z-bit bitmap, the subset of subbands 1010 to which the UE should apply an override precoder of the plurality of override precoders $1008_1$, $1008_2$, $1008_3$, and $1008_4$ and/or the subbands to which the UE should apply the default precoder 1004. In this example, Z may represent the number of subbands in the UE's PUSCH assignment.

In some aspects, the BS may signal the location of the subset of subbands 1010 by applying Equation (3) below to indicate one out of potential (Z choose L) number of subband locations for the set of subbands 1010:

$$\text{ceiling}(\log(Z \text{ choose } L)) \tag{Eq. 3},$$

where Z represents the number of subbands in a PUSCH assignment, and L represents the number of subbands in which the UE should use an override precoder in the PUSCH assignment (e.g., the subset of subbands 1010). The operation (Z choose L) may provide the number of combinations of choosing the L subbands from Z subbands.

The value of Z may vary with the size of the PUSCH assignment (e.g., number of RBs in the PUSCH assignment). For example, as more RBs are included in the PUSCH assignment, the larger the value of Z, which may lead to a variable size in DCI for UL subband precoding signaling. In some aspects, to fix the DCI size for subband precoding signaling, the BS and/or the UE may set Z equal to the number of subbands in the active UL BWP or UL channel bandwidth. For example, the size of Z is set to the worst-case scenario, which is the maximum number of subbands allowed in the channel bandwidth. Such an implementation may apply a brute force technique for avoiding an ambiguity to the DCI size.

Figure 11:
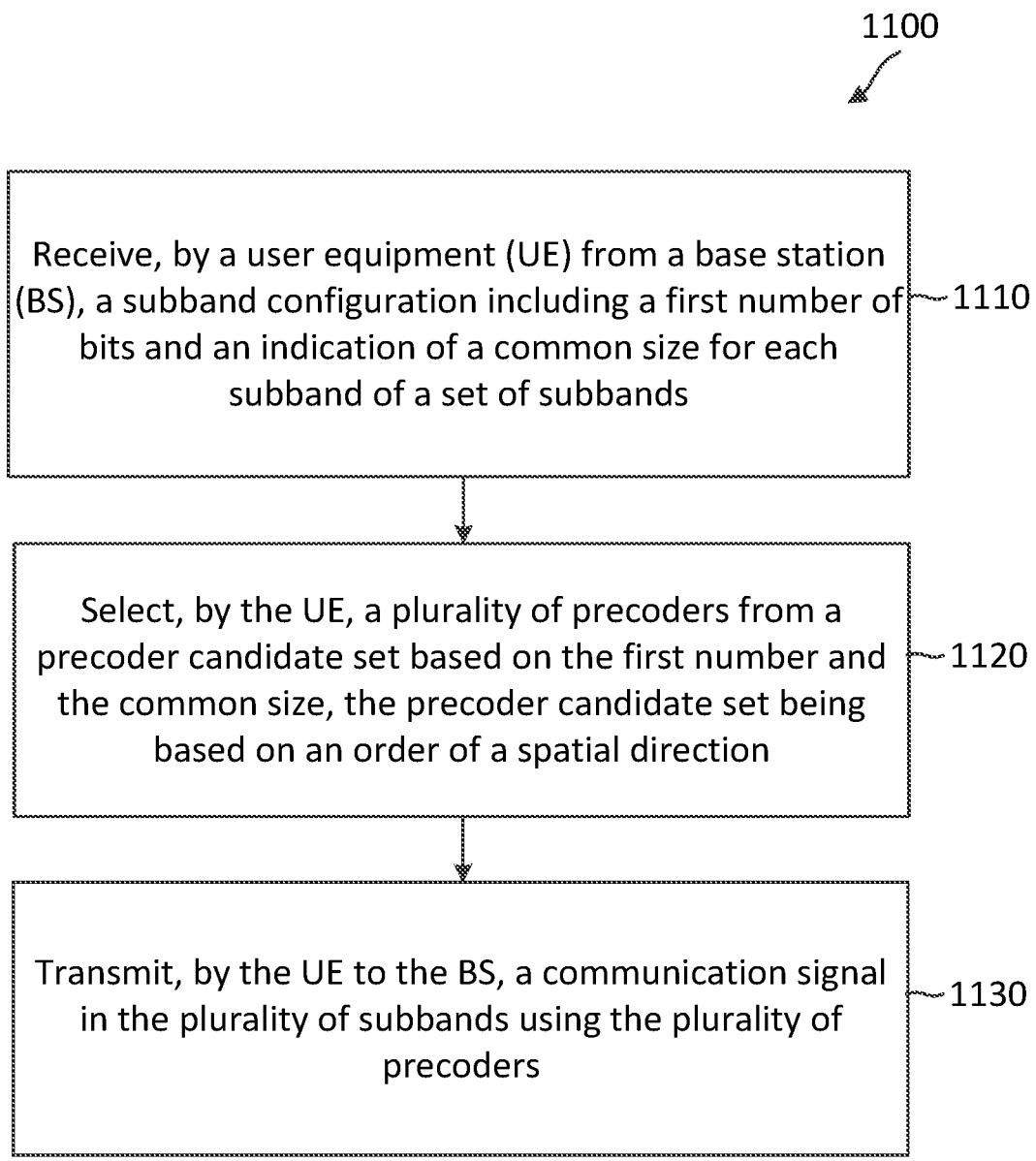
FIG. 11 is a flow diagram of a communication method according to some aspects of the present disclosure.

FIG. 11 is a flow diagram of a communication method 1100 according to some aspects of the present disclosure. Steps of the method 1100 can be executed by a computing device (e.g., a processor, processing circuit, and/or other suitable component) of a wireless communication device or other suitable means for performing the steps. For example, a wireless communication device, such as the UE 115, UE 315, UE 400 may utilize one or more components, such as the processor 402, the memory 404, the precoder candidate module 408, the precoder override module 409, the transceiver 410, the modem 412, and the one or more antennas 416, to execute the steps of method 1100. As illustrated, the method 1100 includes a number of enumerated steps, but aspects of the method 1100 may include additional steps before, after, and in between the enumerated steps. In some aspects, one or more of the enumerated steps may be omitted or performed in a different order.

At step 1110, the method 1100 includes receiving, by a UE from a BS, a subband precoding configuration including a first number of bits and an indication of a common size for each subband of a set of subbands.

At step 1120, the method 1100 includes selecting, by the UE, a plurality of precoders from a precoder candidate set based on the first number and the common size, the precoder candidate set being based on an order of a spatial direction.

At step 1130, the method 1100 includes transmitting, by the UE to the BS, a communication signal in the set of subbands using the plurality of precoders.

Figure 12:
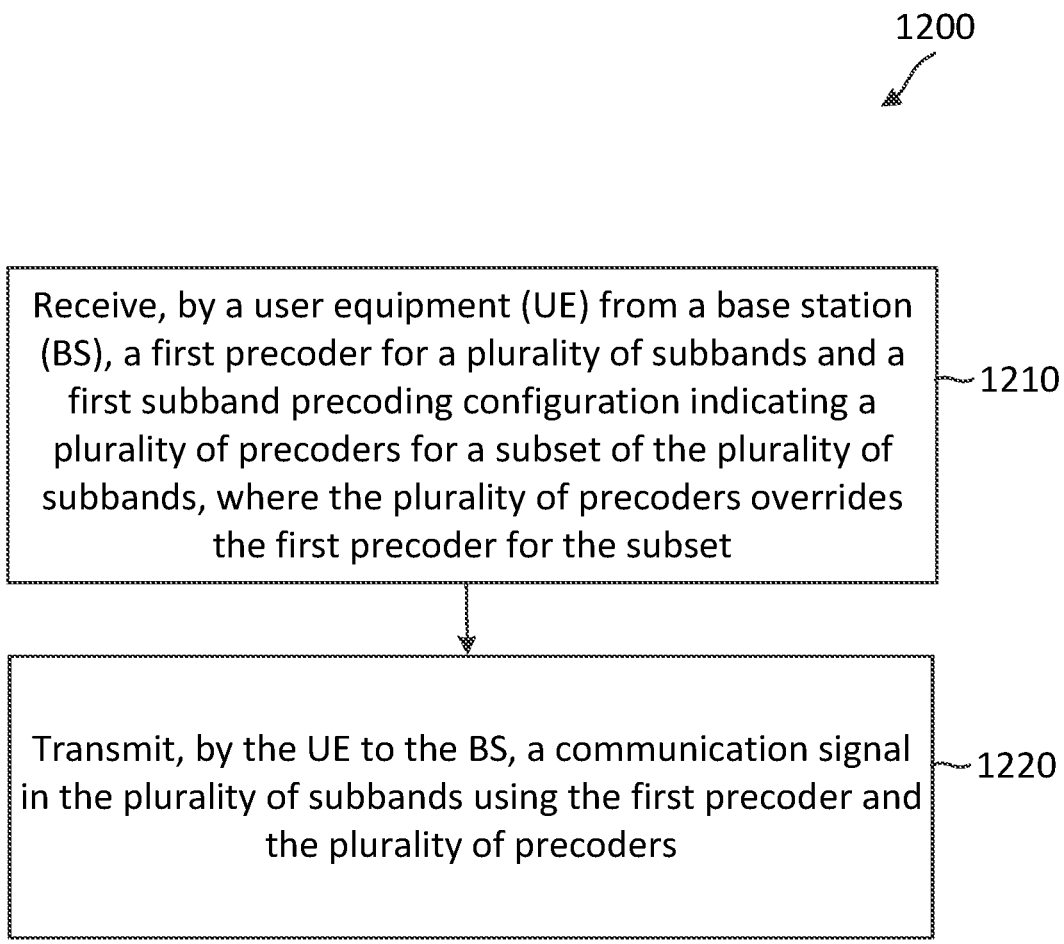
FIG. 12 is a flow diagram of a communication method according to some aspects of the present disclosure.

FIG. 12 is a flow diagram of a communication method 1200 according to some aspects of the present disclosure. Steps of the method 1200 can be executed by a computing device (e.g., a processor, processing circuit, and/or other suitable component) of a wireless communication device or other suitable means for performing the steps. For example, a wireless communication device, such as the UE 125, UE 315, UE 400 may utilize one or more components, such as the processor 402, the memory 404, the precoder candidate module 408, the precoder override module 409, the transceiver 410, the modem 412, and the one or more antennas 416, to execute the steps of method 1200. As illustrated, the method 1200 includes a number of enumerated steps, but aspects of the method 1200 may include additional steps before, after, and in between the enumerated steps. In some aspects, one or more of the enumerated steps may be omitted or performed in a different order.

At step 1210, the method 1200 includes receiving, by a UE from a BS, a first precoder for a plurality of subbands and a first subband precoding configuration indicating a plurality of precoders for a subset of the plurality of subbands, where the plurality of precoders overrides the first precoder for the subset.

At step 1220, the method 1200 includes transmitting, by the UE to the BS, a communication signal in the plurality of subbands using the first precoder and the plurality of precoders.

Figure 13:
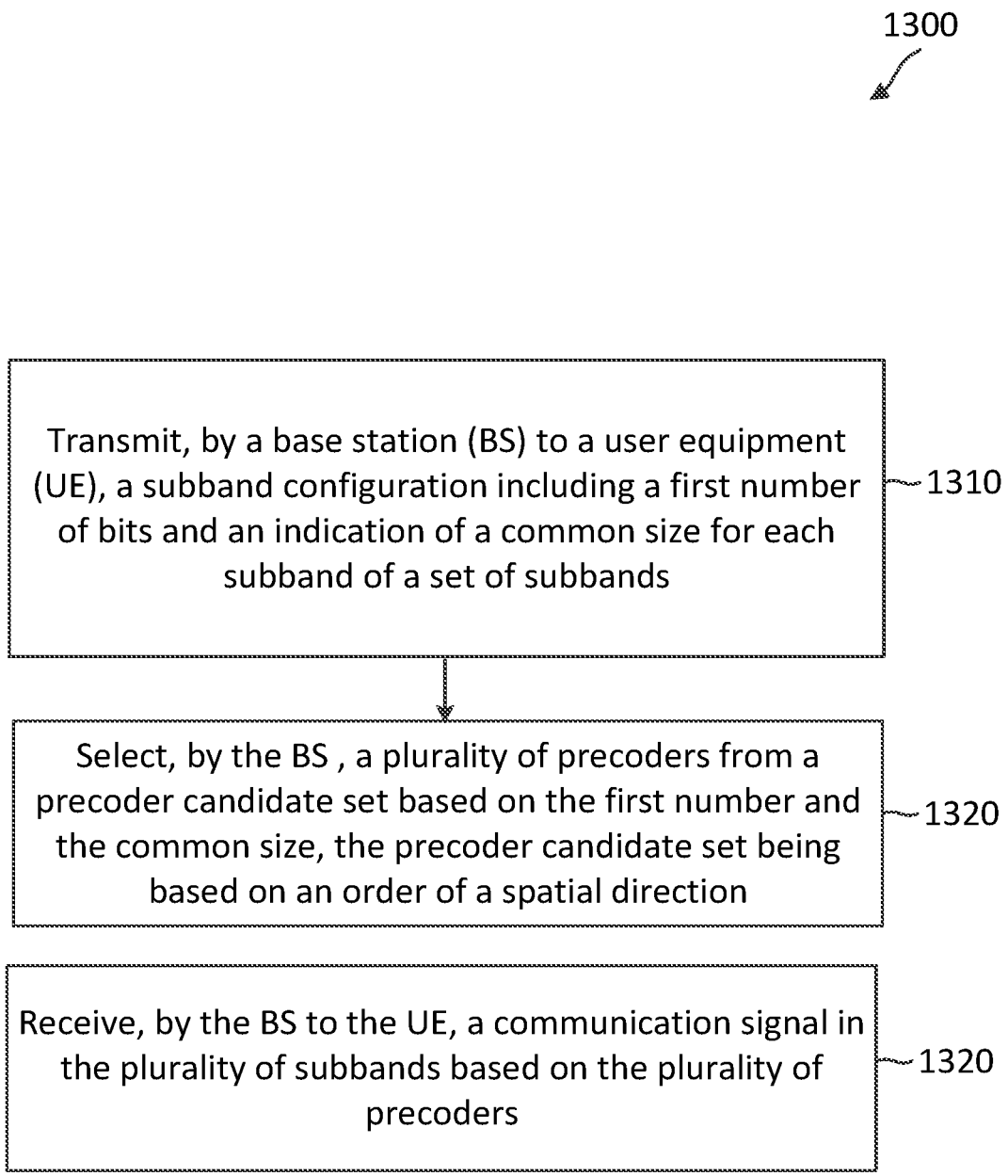
FIG. 13 is a flow diagram of a communication method according to some aspects of the present disclosure.

FIG. 13 is a flow diagram of a communication method 1300 according to some aspects of the present disclosure. Steps of the method 1300 can be executed by a computing device (e.g., a processor, processing circuit, and/or other suitable component) of a wireless communication device or other suitable means for performing the steps. For example, a wireless communication device, such as the BS 105 or BS 500 may utilize one or more components, such as the processor 502, the memory 504, the precoder candidate module 508, the precoder override module 509, the transceiver 510, the modem 512, and the one or more antennas 516, to execute the steps of method 1300. As illustrated, the method 1300 includes a number of enumerated steps, but aspects of the method 1300 may include additional steps before, after, and in between the enumerated steps. In some aspects, one or more of the enumerated steps may be omitted or performed in a different order.

At step 1310, the method 1300 includes transmitting, by a BS to a UE, a subband precoding configuration including a first number of bits and an indication of a common size for each subband of a set of subbands.

At step 1320, the method 1300 includes selecting, by the BS, a plurality of precoders from a precoder candidate set based on the first number and the common size, the precoder candidate set being based on an order of a spatial direction.

At step 1320, the method 1300 includes receiving, by the BS from the UE, a communication signal in the set of subbands based on the plurality of precoders.

Figure 14:
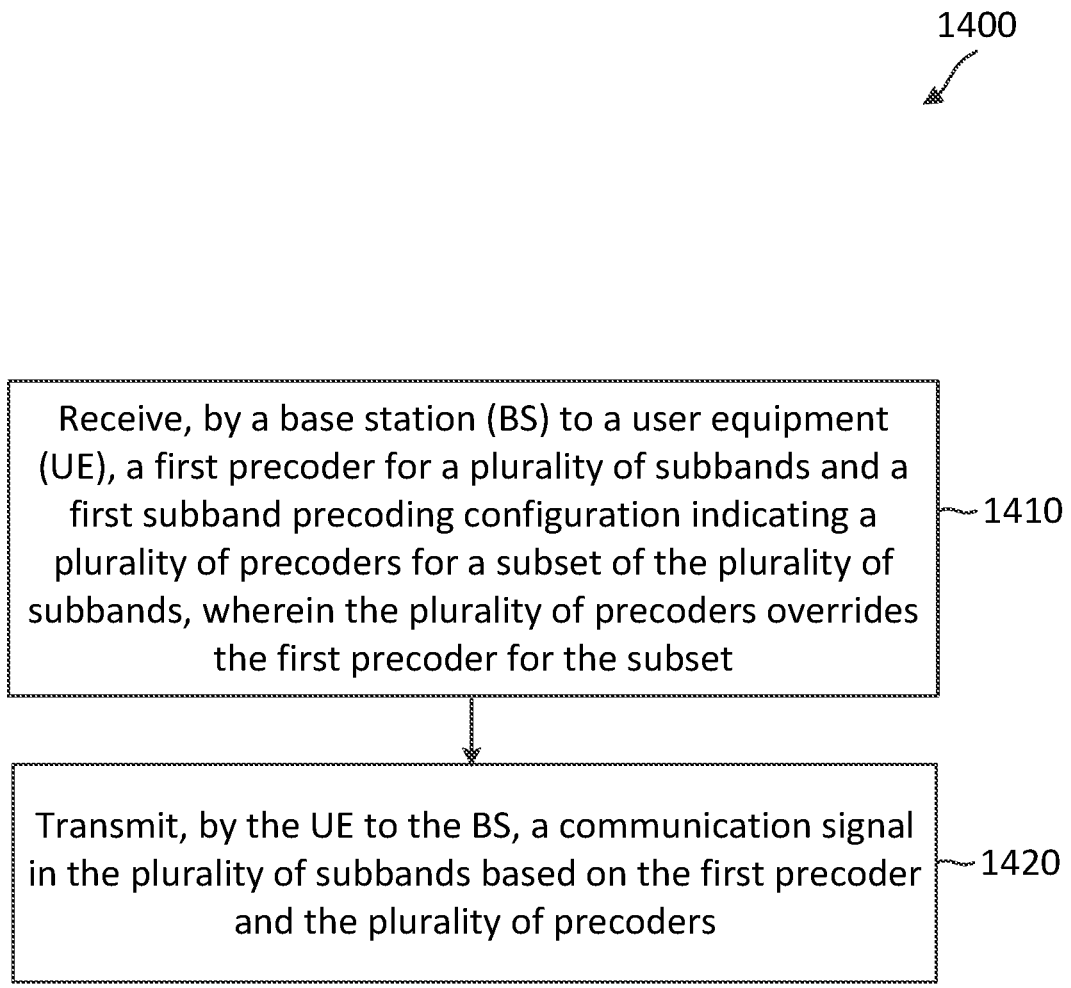
FIG. 14 is a flow diagram of a communication method according to some aspects of the present disclosure.

FIG. 14 is a flow diagram of a communication method 1400 according to some aspects of the present disclosure. Steps of the method 1400 can be executed by a computing device (e.g., a processor, processing circuit, and/or other suitable component) of a wireless communication device or other suitable means for performing the steps. For example, a wireless communication device, such as the BS 105 or BS 500 may utilize one or more components, such as the processor 502, the memory 504, the precoder candidate module 508, the precoder override module 509, the transceiver 510, the modem 512, and the one or more antennas 516, to execute the steps of method 1400. As illustrated, the method 1400 includes a number of enumerated steps, but aspects of the method 1400 may include additional steps before, after, and in between the enumerated steps. In some aspects, one or more of the enumerated steps may be omitted or performed in a different order.

At step 1410, the method 1400 includes transmitting, by a BS to a UE, a first precoder for a plurality of subbands and a first subband precoding configuration indicating a plurality of precoders for a subset of the plurality of subbands, wherein the plurality of precoders overrides the first precoder for the subset.

At step 1420, the method 1400 includes receiving, by the BS from the UE, a communication signal in the plurality of subbands based on the first precoder and the plurality of precoders.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a user equipment (UE) from a base station (BS), a subband precoding configuration, the subband precoding configuration including a first number of bits and an indication of a common size for each subband of a set of subbands;
selecting, by the UE and based on the first number of bits and the common size for each subband of the set of subbands, a plurality of precoders from a precoder candidate set, the precoder candidate set being based on an order of a spatial direction, wherein the selecting the plurality of precoders includes selecting at least one first precoder based on a second number of bits and selecting at least one second precoder based on a third number of bits different than the second number of bits; and
transmitting, by the UE to the BS in the set of subbands, a communication signal generated by applying a respective precoder of the selected plurality of precoders to each subband of the set of subbands,
wherein the communication signal includes, based on the plurality of precoders, signals in a plurality of spatial directions with a plurality of beam width angles.

2. The method of claim 1, further comprising:
receiving, by the UE, a physical uplink shared channel (PUSCH) assignment for transmitting the communication signal, the PUSCH assignment including a fourth number of resource blocks (RBs);
determining, based on the fourth number and the common size, a fifth number of subbands in the set of subbands for the PUSCH assignment; and
identifying, from the first number of bits, a first set of bit groups, each bit group of the first set of bit groups including the second number of bits, and each bit group of the first set of bit groups indicating one precoder of the plurality of precoders,
wherein the second number is a quotient of the first number and the fifth number.

3. The method of claim 2, wherein the identifying further comprises:
identifying, from the first number of bits, a second set of bit groups, each bit group of the second set of bit groups including the third number of bits, and each bit group of the second set of bit groups indicating one precoder of the plurality of precoders,
wherein the third number is a sum of the quotient and one.

4. The method of claim 1, wherein receiving the subband precoding configuration includes receiving, by the UE from the BS, downlink control information (DCI) including a DCI field, the DCI field includes the first number of bits.

5. The method of claim 1, wherein receiving the subband precoding configuration includes receiving, by the UE from the BS, the subband precoding configuration via radio resource control (RRC) signaling, and wherein the first number of bits is fixed.

6. The method of claim 1, further comprising:
receiving, by the UE, a physical uplink shared channel (PUSCH) assignment for transmitting the communication signal including a fourth number of resource blocks (RBs);
determining, based on the second number and the common size, a fifth number of subbands in the set of subbands for the PUSCH assignment; and
determining, based on the first number and the third number, the second number of bits for indicating a precoder per subband of the set of subbands,
wherein selecting the plurality of precoders includes selecting from a sixth number of precoders based on the second number of bits.

7. The method of claim 6, wherein the sixth number is 2 to the power of the second number, wherein determining the fifth number includes determining a quotient of the second number and the common size, and wherein determining the second number includes determining a quotient of the first number and the fifth number.

8. An apparatus, comprising:
a transceiver configured to:
receive, by a user equipment (UE) from a base station (BS), a subband precoding configuration, the subband precoding configuration including a first number of bits and an indication of a common size for each subband of a set of subbands; and
a processor configured to:
select a plurality of precoders from a precoder candidate set based on the first number of bits and the common size for each subband of the set of subbands, the precoder candidate set being based on an order of a spatial direction, wherein, to select the plurality of precoders, the processor is configured to select at least one first precoder based on a second number of bits and selecting at least one second precoder based on a third number of bits different than the second number of bits; and
the transceiver further configured to:
transmit, by the UE to the BS in the set of subbands, a communication signal generated by applying a respective precoder of the selected plurality of precoders to each subband of the set of subbands,
wherein the communication signal includes, based on the plurality of precoders, signals in a plurality of spatial directions with a plurality of beam width angles.

9. The apparatus of claim 8, wherein the transceiver is further configured to:
receive a physical uplink shared channel (PUSCH) assignment for transmitting the communication signal, the PUSCH assignment including a fourth number of resource blocks (RBs), and
wherein the processor is configured to:
determine, based on the second number and the common size, a fifth number of subbands in the set of subbands for the PUSCH assignment; and
identify, from the first number of bits, a first set of bit groups, wherein each bit group of the first set of bit groups includes the second number of bits, and each bit group of the first set of bit groups indicates one precoder of the plurality of precoders,
wherein the second number is a quotient of the first number and the fifth number.

10. The apparatus of claim 9, wherein the processor is further configured to:
identify, from the first number of bits, a second set of bit groups, each bit group of the second set of bit groups including the third number of bits, and each bit group of the second set of bit groups indicating one precoder of the plurality of precoders, wherein the third number is a sum of the quotient and one.

11. The apparatus of claim 8, wherein the transceiver is further configured to:

receive a physical uplink shared channel (PUSCH) assignment for transmitting the communication signal, the PUSCH assignment including a fourth number of resource blocks (RBs), and wherein the processor is further configured to:

determine, based on the second number and the common size, a fifth number of subbands in the set of subbands for the PUSCH assignment; and determine, based on the first number and the third number, the second number of bits for indicating a precoder per subband of the set of subbands, wherein the plurality of precoders includes a sixth number of precoders based on the second number of bits.

12. The apparatus of claim 11, wherein the sixth number is 2 to a power of the second number, wherein the fifth number is a quotient of the second number and the common size, and wherein the second number is a quotient of the first number and the fifth number.

13. The apparatus of claim 8, wherein the transceiver is configured to receive, by the UE from the BS, downlink control information (DCI) including a DCI field, the DCI field including the first number of bits.

14. The apparatus of claim 8, wherein the transceiver is configured to receive, by the UE from the BS, the subband precoding configuration via radio resource control (RRC) signaling, and wherein the first number of bits is fixed.

15. A non-transitory computer-readable medium having program code recorded thereon, the program code comprising:

code for causing a user equipment (UE) to receive, from a base station (BS), a subband precoding configuration, the subband precoding configuration including a first number of bits and an indication of a common size for each subband of a set of subbands;

code for causing the UE to select, based on the first number of bits and the common size for each subband of the set of subbands, a plurality of precoders from a precoder candidate set, wherein the precoder candidate set is based on an order of a spatial direction, wherein the selection of the plurality of precoders includes selection of at least one first precoder based on a second number of bits and selecting at least one second precoder based on a third number of bits different than the second number of bits; and code for causing the UE to transmit, to the BS in the set of subbands, a communication signal generated by applying a respective precoder of the selected plurality of precoders to each subband of the set of subbands, wherein the communication signal includes, based on the plurality of precoders, signals in a plurality of spatial directions with a plurality of beam width angles.

16. The non-transitory computer-readable medium of claim 15, the program code comprising:

code for causing the UE to receive a physical uplink channel (PUSCH) assignment for transmitting the communication signal, the PUSCH assignment including a fourth number of resource blocks (RBs).

17. The non-transitory computer-readable medium of claim 16, the program code further comprising:

code for causing the UE to determine, based on the second number and the common size, a fifth number of subbands in the set of subbands for the PUSCH assignment; and code for causing the UE to identify, from the first number of bits, a first set of bit groups, wherein each bit group of the first set of bit groups includes the second number of bits, and each bit group of the first set of bit groups indicates one precoder of the plurality of precoders, wherein the second number is a quotient of the first number.

18. The non-transitory computer-readable medium of claim 17, the program code further comprising:

code for causing the UE to identify, from the first number of bits, a second set of bit groups, each bit group of the second set of bit groups including the third number of bits, and each bit group of the second set of bit groups indicating one precoder of the plurality of precoders, wherein the third number is a sum of the quotient and one.

19. The non-transitory computer-readable medium of claim 16, the program code further comprising:

code for causing the UE to receive a physical uplink channel (PUSCH) assignment for transmitting the communication signal, the PUSCH assignment including a fourth number of resource blocks (RBs);

code for causing the UE to determine, based on the second number and the common size, a fifth number of subbands in the set of subbands for the PUSCH assignment; and code for causing the UE to determine, based on the first number and the third number, the second number of bits for indicating a precoder per subband of the set of subbands, wherein the plurality of precoders includes a sixth number of precoders based on the second number of bits.

20. The non-transitory computer-readable medium of claim 19, wherein the sixth number is 2 to a power of the second number, the program code further comprising:

code for causing the UE to divide the fourth number by the common size to determine the fifth number; and code for causing the UE to divide the first number by the fifth number to determine the second number.

21. The non-transitory computer-readable medium of claim 15, wherein the code for causing the UE to receive the subband precoding configuration includes code for causing the UE to receive from the BS, downlink control information (DCI) including a DCI field, the DCI field including the first number of bits.

22. The non-transitory computer-readable medium of claim 15, wherein the code for causing the UE to receive the subband precoding configuration includes code for causing the UE to receive from the BS, the indication of the common size via radio resource control (RRC) signaling, and wherein the first number of bits is fixed.

23. An apparatus, comprising:

means for receiving, from a base station (BS), a subband precoding configuration, the subband precoding configuration including a first number of bits and an indication of a common size for each subband of a set of subbands;

means for selecting, based on the first number of bits and the common size for each subband of the set of subbands, a plurality of precoders from a precoder candidate set, wherein the precoder candidate set is based on an order of a spatial direction, wherein the selecting the plurality of precoders includes selecting at least one first precoder based on a second number of bits and selecting at least one second precoder based on a third number of bits different than the second number of bits; and means for transmitting, to the BS in the set of subbands, a communication signal generated by applying a respective precoder of the selected plurality of precoders to each subband of the set of subbands, wherein the communication signal includes, based on the plurality of precoders, signals in a plurality of spatial directions with a plurality of beam width angles.

24. The apparatus of claim 23, further comprising:

means for receiving a physical uplink shared channel (PUSCH) assignment for transmitting the communication signal, the PUSCH assignment including a fourth number of resource blocks (RBs);

means for determining, based on the second number and the common size, a fifth number of subbands for the PUSCH assignment; and means for identifying, from the first number of bits, a first set of bit groups, each bit group of the first set of bit groups including the second number of bits, and each bit group of the first set of bit groups indicating one precoder of the plurality of precoders, wherein the second number is a quotient of the first number and the fifth number.

25. The apparatus of claim 24, further comprising:

means for identifying, from the first number of bits, a second set of bit groups, each bit group of the second set of bit groups including the third number of bits, and each bit group of the second set of bit groups indicating one precoder of the plurality of precoders, wherein the third number is a sum of the quotient and one.

26. The apparatus of claim 23, wherein the means for receiving the subband precoding configuration includes means for receiving from the BS, downlink control information (DCI) including a DCI field, the DCI field including the first number of bits.

27. The apparatus of claim 23, wherein the means for receiving the subband precoding configuration includes means for receiving from the BS, the indication of the common size via radio resource control (RRC) signaling, and wherein the first number of bits is fixed.

28. The apparatus of claim 23, further comprising:

means for receiving a physical uplink shared channel (PUSCH) assignment for transmitting the communication signal, the PUSCH assignment including a fourth number of resource blocks (RBs);

means for determining, based on the second number and the common size, a fifth number of subbands for the PUSCH assignment; and means for determining, based on the first number and the third number, the second number of bits for indicating a precoder per subband of the set of subbands, wherein the means for selecting the plurality of precoders includes means for selecting from a sixth number of precoders based on the second number of bits.

29. The apparatus of claim 28, wherein the sixth number is 2 to a power of the second number, wherein the means for determining the fifth number includes means for determining a quotient of the second number and the common size, and wherein means for determining the second number includes means for determining a quotient of the first number and the fifth number.

* * * * *